United States Patent
Adams et al.

(10) Patent No.: US 11,867,043 B1
(45) Date of Patent: Jan. 9, 2024

(54) REMOTELY-CONTROLLED PRESSURE BLEED-OFF SYSTEM

(71) Applicant: KLX Energy Services LLC, Houston, TX (US)

(72) Inventors: Dustin J. Adams, Dickinson, ND (US); Jason A. Golden, Dickinson, ND (US); Terry G. Wilcox, Dickinson, ND (US)

(73) Assignee: KLX ENERGY SERVICES LLC, Houston, TX (US)

( * ) Notice: Subject to any disclaimer, the term of this patent is extended or adjusted under 35 U.S.C. 154(b) by 265 days.

(21) Appl. No.: 17/119,391

(22) Filed: Dec. 11, 2020

Related U.S. Application Data

(60) Provisional application No. 62/947,901, filed on Dec. 13, 2019.

(51) Int. Cl.
| | |
|---|---|
| *E21B 43/26* | (2006.01) |
| *F16K 5/10* | (2006.01) |
| *E21B 34/02* | (2006.01) |
| *F16K 37/00* | (2006.01) |
| *F16K 31/04* | (2006.01) |
| *E21B 34/16* | (2006.01) |

(52) U.S. Cl.
CPC ........ *E21B 43/2607* (2020.05); *E21B 34/025* (2020.05); *E21B 34/16* (2013.01); *F16K 31/047* (2013.01); *F16K 37/005* (2013.01); *F16K 5/10* (2013.01)

(58) Field of Classification Search
CPC ......... E21B 43/26; E21B 43/2607; F16K 5/10
See application file for complete search history.

(56) References Cited

U.S. PATENT DOCUMENTS

| | | | |
|---|---|---|---|
| 2,768,640 | A | 10/1956 | Zimmer et al. |
| 3,978,695 | A | 9/1976 | Hurzeler et al. |
| 4,766,728 | A | 8/1988 | Glomeau |
| 5,431,182 | A | 7/1995 | Brown |
| 7,013,906 | B2 | 3/2006 | Pearson |
| 7,798,233 | B2 | 9/2010 | Daniel et al. |
| 8,763,983 | B2 | 7/2014 | Lymberopoulos et al. |
| 8,851,108 | B2 | 10/2014 | Lymberopoulos et al. |
| 8,998,168 | B2 | 4/2015 | Witkowski et al. |

(Continued)

OTHER PUBLICATIONS

House, et al.; "The Value of Pressure Relief in Hydraulic Fracturing Operations"; Copyright 2017; Offshore Technology Conference; 15 pages.

*Primary Examiner* — Shane Bomar
(74) *Attorney, Agent, or Firm* — McAfee & Taft

(57) ABSTRACT

A pressure bleed-off system. The system includes a fluid bypass line having an inlet and an opposing outlet, wherein the inlet is in fluid communication with a high pressure frac line for a hydraulic fracturing operation. The system also includes a high pressure transducer located proximate the fluid inlet, a first plug valve residing along the fluid bypass line, and a first electric actuator residing on the first plug valve. The actuator is configured to rotate the first plug valve between close and open positions in response to command signals from a controller. The controller, in turn, sends the command signals in response to control signals delivered by an operator, remotely. Preferably, the command signals are wireless signals sent from outside of the red zone. The system may also include a second plug valve along the bypass line.

32 Claims, 13 Drawing Sheets

(56) References Cited

U.S. PATENT DOCUMENTS

| | | |
|---|---|---|
| 9,057,448 B2 | 6/2015 | Lymberopoulos |
| 9,103,448 B2 | 8/2015 | Witkowski et al. |
| 9,103,465 B2 | 8/2015 | Lymberopoulos |
| 9,163,619 B2 | 10/2015 | Lymberopoulos |
| 9,163,750 B2 | 10/2015 | Lymberopoulos et al. |
| 9,273,543 B2 | 3/2016 | Baca et al. |
| 9,322,243 B2 | 4/2016 | Baca et al. |
| 9,341,056 B2 | 5/2016 | Weightman et al. |
| 9,341,279 B2 | 5/2016 | McNabney et al. |
| 9,353,775 B2 | 5/2016 | Young |
| 9,353,882 B2 | 5/2016 | Young |
| 9,395,015 B2 | 7/2016 | Young |
| 9,429,241 B2 | 8/2016 | Eagen |
| 9,441,453 B2 | 9/2016 | Lymberopoulos et al. |
| 9,518,675 B2 | 12/2016 | Cook et al. |
| 9,671,794 B1 | 6/2017 | Lymberopoulos et al. |
| 9,857,807 B2 | 1/2018 | Baca et al. |
| 10,289,125 B2 | 5/2019 | Imel et al. |
| 10,550,665 B1 | 2/2020 | Golden et al. |
| 10,768,642 B2 * | 9/2020 | Bishop ............... G05D 7/01 |
| 11,506,126 B2 * | 11/2022 | Hinderliter ............ F02C 9/40 |
| 2005/0129531 A1 | 6/2005 | Fenny et al. |
| 2006/0151027 A1 | 7/2006 | Pearson |
| 2010/0154894 A1 | 6/2010 | Kotapish et al. |
| 2011/0030964 A1 * | 2/2011 | Williams ............ E21B 33/0355 |
| | | 166/325 |
| 2012/0031494 A1 | 2/2012 | Lymberopoulos |
| 2012/0073670 A1 | 3/2012 | Lymberopoulos |
| 2012/0181013 A1 | 7/2012 | Kajaria et al. |
| 2012/0227983 A1 | 9/2012 | Lymberopoulos et al. |
| 2013/0000745 A1 | 1/2013 | Witkowski et al. |
| 2013/0020519 A1 | 1/2013 | Lymberopoulos |
| 2014/0048255 A1 | 2/2014 | Baca et al. |
| 2014/0060020 A1 | 3/2014 | Peterson et al. |
| 2015/0042088 A1 | 2/2015 | Witkowski et al. |
| 2015/0292297 A1 | 10/2015 | Kajaria et al. |
| 2015/0345646 A1 | 12/2015 | Witkowski et al. |
| 2016/0032703 A1 * | 2/2016 | Broussard ........... E21B 43/2607 |
| | | 166/250.01 |
| 2016/0161956 A1 | 6/2016 | Baca et al. |
| 2017/0073670 A1 | 3/2017 | Nishida et al. |
| 2017/0147012 A1 | 5/2017 | Lymberopoulos et al. |
| 2017/0285668 A1 | 10/2017 | Moseley et al. |
| 2018/0259080 A1 * | 9/2018 | Dale ..................... E21B 34/16 |
| 2019/0112977 A1 * | 4/2019 | Kim ...................... F01K 23/10 |
| 2020/0284122 A1 * | 9/2020 | Golden ............. G05D 16/2033 |
| 2022/0300014 A1 * | 9/2022 | Fink ................. G05D 16/204 |
| 2023/0083391 A1 * | 3/2023 | Adams ................ E21B 47/117 |

* cited by examiner

REMOTELY-CONTROLLED PRESSURE BLEED-OFF SYSTEM

CROSS REFERENCE TO RELATED APPLICATIONS

This application claims the benefit of U.S. Ser. No. 62/947,901 entitled "Remotely Controlled Pressure Bleed-Off System." That application was filed on Dec. 13, 2019.

The provisional patent application is incorporated herein in its entirety by reference

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

FIELD OF THE INVENTION

The present disclosure relates to the field of pressure relief valves. More specifically, the invention relates to a pressure relief system, or "bleed-off" system, that is remotely controlled. In some aspects, the invention may be used in connection with a hydraulic fracturing operation or a downhole hydraulic jetting operation at a well site. The invention further relates to a pressure control system for a hydraulic fracturing operation.

Technology in the Field of the Invention

In the drilling of an oil and gas well, a near-vertical wellbore is formed through the earth using a drill bit urged downwardly at a lower end of a drill string. The drill bit is rotated in order to form the wellbore, while drilling fluid is pumped through the drill string and back up to the surface on the back side of the pipe. The drilling fluid serves to cool the bit and flush drill cuttings during rotation.

After drilling to a predetermined vertical depth, the wellbore may be deviated. The deviation may be at a "kick-off" angle of, for example, 45 degrees or 60 degrees. The ability to deviate a wellbore enables the operator to form multiple separate wellbores that penetrate a target formation from essentially a single well pad.

Within the last two decades, advances in drilling technology have enabled oil and gas operators to economically "kick-off" and steer wellbore trajectories from a generally vertical orientation to a generally horizontal orientation. This represents a 90-degree deviation. The horizontal "leg" of each of these wellbores now often exceeds a length of one mile, if not two miles. This significantly multiplies the wellbore exposure to a target hydrocarbon-bearing formation (or "pay zone"). For example, for a given target pay zone having a (vertical) thickness of 100 feet, a one mile horizontal leg exposes 52.8 times as much pay zone to a horizontal wellbore as compared to the 100-foot exposure of a conventional vertical wellbore.

FIG. 1 provides a cross-sectional view of a wellbore 100 having been completed in a horizontal orientation. It can be seen that the wellbore 100 has been formed from the earth surface 10, through numerous earth strata 20a, 20b, ... 20h and down to a hydrocarbon-producing formation 30. The subsurface formation 30 represents a "pay zone" for the oil and gas operator. The wellbore 100 includes a vertical section 40a above the pay zone 30, and a horizontal section 40c. The horizontal section 40c defines a heel 40b and a toe 40d, along with an elongated leg there between that extends generally along the pay zone 30.

In connection with the completion of the wellbore 100, several strings of casing having progressively smaller outer diameters have been cemented into the wellbore 100. These include a string of surface casing 60 and one or more strings of intermediate casing 70. The casing strings 60, 70 are typically cemented into place, with a cement column being shown at 75. It is understood that while only one string of intermediate casing 70 is illustrated in FIG. 1, a deeper wellbore will likely have at least two if not three intermediate casing strings 70.

In addition, a lowest string of casing 80 is placed in the wellbore 100. The lowest string of casing 80, referred to as a production casing, is typically cemented into place as well. This is shown by cement column 90. In some completions, the production casing 80 has external casing packers ("ECP's), swell packers, or some combination thereof spaced across the productive interval in lieu of cement. This creates compartments along the horizontal leg 40c for the isolation of zones and for specific stimulation treatments.

As part of the completion process and before a production tubing string is installed, the production casing 80 is perforated along the horizontal leg 40c. This means that lateral holes 50 are shot through the production casing 80 and the cement column 90 surrounding the casing 80. The perforations allow reservoir fluids to flow into the wellbore 40c. Where swell (or other) packers are provided, the perforating gun penetrates the casing 80, allowing reservoir fluids to flow from the rock formation into the horizontal section 40c along selected zones.

It is understood that the perforation process is conducted using a string of perforating guns (not shown). The perforating guns are shot in stages along the horizontal section 40c. As part of each perforating stage, the formation 30 is fractured. Hydraulic fracturing consists of injecting water with friction reducers or viscous fluids (usually shear thinning, non-Newtonian gels or emulsions) through the working string, down the wellbore 100 into a formation 30 at such high pressures and rates that the reservoir rock parts and forms a network of fractures 25.

Those of ordinary skill in the art will understand that fracturing fluids are not injected directly into the production casing 80; rather, they are injected through a working string, such as a string of coiled tubing (not shown). Bridge plugs may be placed along the wellbore as part of the perforating stages to direct fracturing fluid through the various production zones, sequentially. These bridge plugs may operate with balls that seal on seats, or may be resettable, or may be drilled out. The current inventions are not specific to any formation fracturing equipment used downhole.

The fracturing fluid is typically mixed with a proppant material such as sand, ceramic beads or other granular materials. The proppant serves to hold the fractures 25 open after the hydraulic pressures are released. In the case of so-called "tight" or unconventional formations, the combination of fractures 25 and injected proppant substantially increases the flow capacity, or permeability, of the treated reservoir.

FIG. 1 demonstrates the fractures 25 as a series of half-planes along the horizontal section 40c of the wellbore 100. The fracture half-planes 25 represent the orientation of fractures that will form in connection with a perforating/fracturing operation. According to principles of geo-mechanics, fracture planes will generally form in a direction that is perpendicular to the plane of least principal stress in a rock matrix. Stated more simply, in most wellbores, the rock matrix will part along vertical lines when the horizontal section of a wellbore resides below 3,000 feet, and sometimes as shallow as 1,500 feet, below the surface 10. In this instance, hydraulic fractures will tend to propagate from the wellbore's perforations in a vertical, elliptical plane perpendicular to the plane of least principal stress. If the orientation of the least principal stress plane is known, the longitudinal axis of the horizontal leg 40c is ideally oriented parallel to it such that the multiple fracture planes 25 will intersect the wellbore at-or-near orthogonal to the horizontal leg 40c of the wellbore, as depicted in FIG. 1.

In support of the formation fracturing process, specialized equipment is brought to the wellsite. This equipment may include, for example, water tanks, sand trucks, chemical tanks, and blenders. The blenders are used to mix the water, sand and chemicals. In addition, high pressure frac pumps are provided in order to inject the blended materials, or fracturing fluid, into the wellbore. A so-called hydraulic "frac" tree 65 may be installed over the wellbore 100 to receive the pressured fracturing fluid and direct it downhole.

As part of the equipment, a so-called "frac missile" (shown in FIGS. 8 and 9) is used to receive fluid from the various frac pumps. The frac missile acts as a fluid collections manifold, collecting the fracturing fluid from fluid lines and directing it into a single high-pressure frac line. The high-pressure frac line directs the fracturing fluid to the frac tree 65. In one arrangement, the fracturing fluids are directed to a separate frac manifold, which controls the delivery of injection fluids to a plurality of wells at a single well site.

The fracturing fluid is injected through flow control valves in the frac tree 65, and then into the wellbore 100 at high pressures. Such pressures are frequently in excess of 5,000 psi and oftentimes in excess of about 12,500 psi. The ability to form a series of fracture planes 25 along a single horizontal wellbore 40c has made the production of hydrocarbon reserves from unconventional reservoirs, and particularly shales, economically viable within recent times. Horizontal wells currently comprise approximately six out of every seven wells being drilled in the United States.

In connection with a hydraulic fracturing operation, it is important to control the high pressures residing along the high pressure line that carries fracturing fluids to the frac tree. Accordingly, well sites are equipped with a so-called "pop-off" valve. A pop-off valve is a safety relief valve that serves as a secondary pressure-regulating device. The pop-off valve (not shown) resides along or is otherwise in fluid communication with the high-pressure fluid injection line (or "frac line"). If the pressure-regulating device built into the fracturing pumps (or, optionally, the frac missile or the frac manifold) fails at a set system pressure, the hydro-mechanical pop-off valve will open and allow fracturing fluids to flow there-through before reaching the frac tree 65. In this way, fluids are released from the fluid injection system and pressure is relieved.

Recently, more sophisticated pressure relief valve (or "PRV") systems have been introduced to the industry. Specifically, KLX Inc. of Houston, Texas has introduced a frac relief valve system, known generically as a FRV. The KLX FRV incorporates one or more gate valves that are operated by an accumulator system. U.S. Patent Publ. No. 2017/0285668 presents a version of a KLX FRV.

Safoco Inc., of Houston, Texas, has its own FRV. The Safoco FRV also utilizes a gate valve that is controlled by a "fail open" hydraulic actuator. In the Safoco FRV, pressure is sensed by a pressure transducer. The pressures at which the valve opens and re-closes are field programmable via a keypad interface. U.S. Pat. No. 9,671,794 is an example of a Safoco FRV.

FRV systems protect the integrity of the wellhead and reduce equipment failures such as blown tubing and cracked pumps. FRV systems monitor pressures along the frac line and seek to maintain pressure in the system at or below a rated limit for the associated fracturing equipment.

In addition, some fracturing operations are conducted with a pressure bleed-off valve. The pressure bleed-off valve typically resides between the frac relief valve and the frac tree (or, where a plurality of wellheads is provided at the well site, a frac valve manifold). The pressure bleed-off valve allows the operator to significantly reduce pressure along the frac line between injection stages or whenever an operation is conducted at a frac valve 65 that requires pressure to be reduced.

Opening a pressure bleed-off valve requires that a series of valves be operated in a designated sequence. This requires an individual to manually move these valves at a time when the valves are exposed to extremely high pressures. This is known as a "red zone" operation.

It is desirable to have a pressure bleed-off valve that may be controlled remotely, that is, the valves may be opened using an electrical (or other) motor to open and close valves through remote signals and without an individual being present in the red zone. Further, it is desirable to have a pressure control system that is able to open and close valves associated with a pressure bleed-off system in a desired sequence in response to a single command from an operator. Still further, a need exists for a pressure control system that is able to monitor pressures and control valves associated with both a fracture relief valve and a bleed-off valve simultaneously. In the context of the fracture relief valve (or "FRV"), the valves are preferably opened in less than one second.

BRIEF SUMMARY OF THE INVENTION

An electronically controlled pressure bleed-off system is first provided herein. The pressure bleed-off system is designed to be portable, and preferably resides on a skid. The pressure bleed-off system is ideally suited for use in connection with formation fracturing operations at a wellsite.

In one aspect, the pressure bleed-off system comprises a low pressure line and a high pressure line. Each of the low pressure line and the high pressure line includes a fluid inlet that is in fluid communication with a high pressure fracturing line (or "frac line"). The frac line is used for a hydraulic fracturing operation.

The high pressure line and the low pressure line are connected (or are in fluid communication) by means of a fluid bypass line. Specifically, an inlet end of the high pressure line and an inlet end of the low pressure line are connected to the fluid bypass line.

A low pressure line transducer is located proximate the fluid inlet of the low pressure line. Similarly, a high pressure line transducer is located proximate the fluid inlet of the high pressure line. These transducers send signals indicative of frac line pressure to a system controller.

A pair of electrically-activated plug valves is placed along the high pressure line. These represent a first plug valve and a second plug valve. The first and second plug valves are activated by first and second respective electric actuators.

Similarly, a pair of electrically-activated plug valves is placed along the low pressure line. These represent a third plug valve and a fourth plug valve. The third and fourth plug valves are activated by third and fourth respective electric actuators.

Each of the electric actuators resides on its associated plug valve. Each electric actuator is configured to rotate its associated plug valve between open and close positions. This is done in response to command signals sent from the system controller. Of interest, the controller is configured to receive control instructions from an operator remote from the pressure bleed-off system. In this way, the valves may be selectively opened and closed by an operator using a wired or wireless communications signal from a remote location, allowing the operator to bleed off the frac line without a field hand entering the so-called red zone.

In one aspect, the pressure bleed-off system further comprises a pair of manual plug valves. A first manual plug valve resides intermediate the first and second plug valves along the high pressure line. Similarly, a second manual plug valve resides intermediate the third and fourth plug valves along the low pressure line. The first and second manual plug valves are offered as back-ups in the unlikely event the source of electrical power at the well site should fail.

In one aspect, the fluid inlet of the high pressure line and the fluid inlet of the low pressure line straddle (i) a one-way check valve. The one-way check valve only permits fluids to flow in a direction from the fluid inlet of the low pressure line towards the fluid inlet of the high pressure line. In this way, the high pressure line, the low pressure line, the bypass line and the fluid outlet form a wishbone configuration.

In addition, the fluid inlet of the high pressure line and the fluid inlet of the low pressure line may straddle (ii) a two-way fluid isolation valve. The isolation valve resides between the fluid inlet of the low pressure line and the one-way check valve.

In one embodiment, the controller is configured to send the command signals to open the first and second plug valves in response to a Downstream Bleed-Off signal sent by the operator as a control instruction. The command signals cause the second plug valve to open before the first plug valve is opened. Similarly, the controller is also configured to send the command signals to open the third and fourth plug valves in response to an Upstream Bleed-Off signal sent by the operator as a control instruction. Here, the command signals cause the fourth plug valve to open before the third plug valve is opened.

In another embodiment, the controller is further configured to send command signals to open the first and second plug valves and to open the third and fourth plug valves, as E-Kill signals. This is done in response to (i) the high pressure line transducer, (ii) the low pressure line transducer, or (iii) both, sending a digital signal to the controller indicative of a pressure value that exceeds a stored pressure threshold value.

As noted, the embodiment of the pressure bleed-off system described above is a so-called "wishbone" configuration. The high pressure line and the low pressure line straddle the one-way check valve. In another aspect, a single fluid bypass line coming off of the high pressure frac line is used. The fluid bypass line has a fluid inlet and an opposing fluid outlet. The fluid inlet is in fluid communication with the frac line for a hydraulic fracturing operation. In this instance, the fluid inlet again resides upstream from a one-way check valve.

The pressure bleed-off system of the "straight bypass line" embodiment first includes a high pressure transducer. The high pressure transducer is located proximate the fluid inlet.

The bleed-off system additionally comprises a first plug valve and a second plug valve. Each of these plug valves resides along the fluid bypass line, with the first plug valve being disposed proximate the high pressure transducer. The second plug valve resides proximate the fluid outlet.

Each of the first and second plug valves is moveable between open and close positions through the use of an actuator. Thus, the pressure-bleed-off system includes a first electric actuator residing on the first plug valve and configured to rotate the first plug valve between open and close positions, and a second electric actuator residing on the second plug valve and configured to rotate the second plug valve between open and close positions.

Optionally, the pressure bleed-off system has a manual plug valve residing intermediate the first and second plug valves along the bypass line Additionally, the pressure bleed-off system comprises a controller. The controller is configured to send command signals to each of the first actuator and the second actuator to open and close their respective plug valves. This is done in response to control instructions sent from an operator remotely.

In one aspect, the controller is configured to send the command signals to open the first and second plug valves in response to a Bleed-Off signal sent by the operator as a control instruction. The command signals preferably cause the second plug valve to open before the first plug valve is opened. The controller is further configured to receive a Safe Bleed signal from the operator as a control instruction. This causes the first plug valve, the second plug valve, or both, to be opened a designated amount that is less than fully open.

Finally, the pressure bleed-off system may be placed on a skid. Specifically, the skid supports the fluid bypass line, the high pressure transducer, the first and second plug valves, and the first and second electric actuators. The skid may comprise lift points configured to enable lifting by a winch line.

In addition to the two pressure bleed-off systems described above, a pressure control system for a hydraulic fracturing operation at a well site is provided. In the system, a single operational controller controls the actuation of plug valves for both a pressure relief valve (or "PRV" system) and a pressure bleed-off system.

The pressure control system includes a high pressure frac line, a PRV system, a pressure bleed-off system and a system controller. The frac line will preferably include a one-way check valve residing downstream from the pressure relief valve and the pressure bleed-off system.

The PRV system may comprise:
 a first fluid bypass line having a fluid inlet and an opposing fluid outlet, and wherein the fluid inlet for the fluid bypass line is also in fluid communication with the high pressure frac line;

a pressure sensor residing proximate the fluid inlet and configured to sense fluid pressure within the high pressure frac line, and to generate electrical signals representative of fluid pressure readings within the high pressure frac line in real time; and one or more valves configured to move between a close state and an open state in response to command signals from the system controller.

Each of the one or more valves is preferably an electraulically-actuated valve. Examples of such valves are plug valves, poppet valves and sleeve valves. Preferably, two plug valves are used in series, with each plug valve being moved by a respective actuator. Specifically, each actuator is configured to rotatably move a respective valve from its close state to its open state in response to an actuation signal sent from the system controller. In operation, the controller sends the actuation signal when a fluid pressure reading taken by the pressure sensor exceeds a stored pressure threshold. The actuation signal will cause the actuators to open their respective valve.

Of course, if the system controller receives signals indicating that the fluid injection system is operating below the stored pressure threshold, the controller will continue to monitor pressure readings and maintain the one or more hydraulically-activated valves in its closed position.

Actuation of a valve causes the valve to rotatably move from a close state to an open state, permitting injection fluids to rapidly by-pass, or exit, the fluid injection system. Beneficially, the plug valves may be rotatably moved from their close states to their respective open states in less than 1.5 seconds, or less than 1.0 second, or even less than 0.5 seconds, and with less than one complete revolution.

As noted, the pressure control system further comprises a pressure bleed-off system. In one aspect, the pressure bleed-off system:

a second fluid bypass line having a fluid inlet and an opposing fluid outlet, and wherein the fluid inlet for the second fluid bypass line is also in fluid communication with the high pressure frac line;

a high pressure transducer located proximate the fluid inlet for the second bypass line;

a first plug valve and a second plug valve residing along the fluid bypass line in series;

a first electric actuator residing on the first plug valve and configured to rotate the first plug valve between close and open positions; and a second electric actuator residing on the second plug valve and configured to rotate the second plug valve between close and open positions;

As noted, the pressure control system also includes a system controller. The system controller is configured to:

(i) receive the electrical signals from the pressure sensor, and process those signals by comparing fluid pressure readings with a stored pressure threshold, wherein the system controller is programmable to set the stored pressure threshold and to send actuation signals to open the one or more hydraulically-actuated valves in response to determining that the pressure in the fluid injection system meets or exceeds the stored pressure threshold; and (ii) send command signals to each of the first actuator and the second actuator of the pressure bleed-off system to open and close their respective plug valves.

In the pressure control system, the pressure bleed-off system may further comprise:

a manual plug valve residing intermediate the first and second plug valves along the second fluid bypass line; and a bypass line transducer located intermediate the manual plug valve and the second plug valve of the pressure bleed-off system.

In a preferred arrangement, a high-pressure line extends from the high pressure frac pumps, or from a manifold (or "frac missile") associated with the high-pressure frac pumps, to a frac manifold. Jumper lines then carry injection fluids from the frac manifold to a frac tree at a selected well. The pressure relief valve system may be teed off of the high-pressure line downstream of the frac missile such that the fluid inlet receives the fracturing fluids directly from the high-pressure line.

The pressure control system may also include a one-way check valve. The one-way check valve resides along the high pressure frac line proximate to but downstream of the fluid inlet of the pressure bleed-off system in a direction of flow within the high pressure frac line.

Of importance, the controller is configured to receive control instructions from an operator remote from the pressure control system. In this way, the operator may remotely cause pressure bleed-off in the pressure control system. Specifically, the controller is configured to send the command signals to open the first and second plug valves of the pressure bleed-off system in response to a Bleed-Off signal sent by the operator as a control instruction. The controller is further configured to receive a Safe Bleed signal from the operator as a control instruction. This causes the first plug valve, the second plug valve, or both, to be opened a designated amount that is less than fully open.

The controller is further configured to send command signals to open the at least one electraulically-operated plug valve of the PRV and the first and second plug valves of the pressure bleed-off system substantially simultaneously, as E-Kill signals. The E-Kill signals are sent in response to (i) the pressure sensor, (ii) the high pressure transducer, or (iii) both, sending a digital signal to the controller indicative of a pressure value that exceeds the pressure threshold value.

In one aspect of the pressure control system, the system controller receives signals from multiple pressure transducers indicative of pressure at multiple locations along the fluid injection system, including at the high-pressure frac pumps, the frac missile, the high-pressure frac line, the fluid inlets, a frac manifold and/or a flow control valve associated with the frac tree. Pressure readings from the multiple pressure transducers may be compared and analyzed. In this way, the controller may be able to distinguish between normal pressure kicks, temporary screen out conditions, and undesirable pressure build-up conditions that require an actuation signal.

It is also preferred that the pressure relief valve, the pressure bleed-off system, or both includes on-board batteries. The batteries are configured to provide power to the system controller and to the actuators.

In addition to the above, a method of servicing a pressure bleed-off system is provided. The pressure bleed-off system is used for a hydraulic fracturing operation at a well site. In one embodiment, the method comprises:

providing a skid, wherein the skid defines a steel frame having a platform, a plurality of beams extending up from the platform, and an I-beam residing horizontally over the platform and supported by the upwardly-extending beams; and providing a pressure bleed-off system supported at least partially by the platform of the skid, wherein the pressure bleed-off system comprises:
    a fluid bypass line having a fluid inlet and an opposing fluid outlet, and wherein the fluid inlet is in fluid communication with a high pressure frac line for a hydraulic fracturing operation at a well site;
    a high pressure transducer located proximate the fluid inlet;
    a first plug valve residing along the fluid bypass line;
    a first electric actuator residing on the first plug valve and configured to rotate the first plug valve between close and open positions; and
    a controller configured to send command signals to the first actuator to rotate the first plug valve between its close and open positions, wherein the controller is configured to receive control instructions from an operator remote from the pressure bleed-off system.

Optionally, the method further comprises:
electrically connecting the system controller to a test computer; and
sending a test signal to the first electric actuator in order to cycle the associated first plug valve between its closed and open positions.

Alternatively, the method further comprises:
providing a trolley along the I-beam; and
providing a hoist along the I-beam, wherein the hoist is movable along a portion of the I-beam by means of the trolley.

The hoist includes a come-along chain used for lifting and servicing the plug valve.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Definitions

Figure 1:
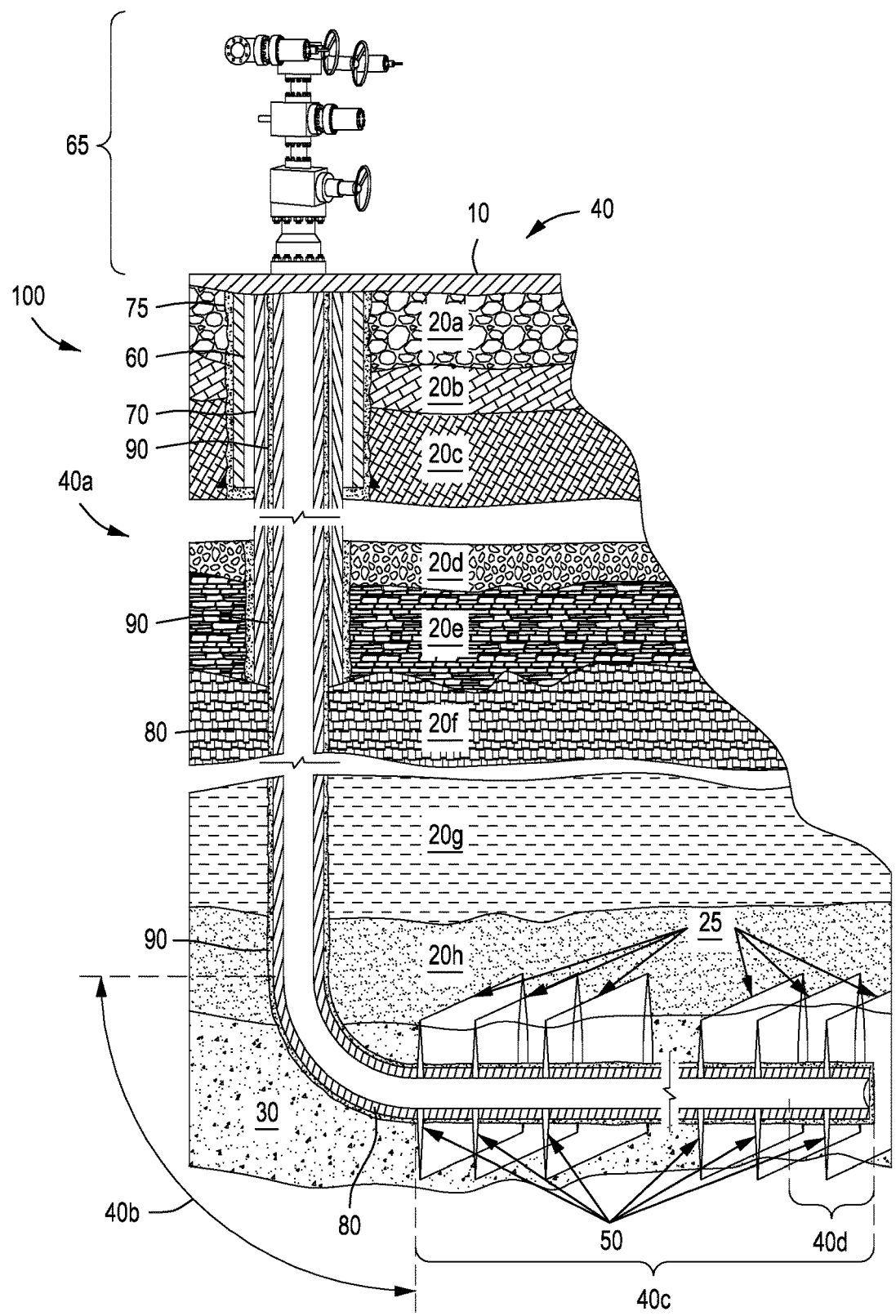
FIG. 1 is cross-sectional view of a wellbore having been completed with a horizontal leg. The illustrative wellbore has undergone a hydraulic fracturing operation.

For purposes of the present application, it will be understood that the term "hydrocarbon" refers to an organic compound that includes primarily, if not exclusively, the elements hydrogen and carbon. Hydrocarbons may also include other elements, such as, but not limited to, halogens, metallic elements, nitrogen, oxygen, and/or sulfur.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions, or at ambient condition. Hydrocarbon fluids may include, for example, oil, natural gas, coalbed methane, shale oil, pyrolysis oil, pyrolysis gas, a pyrolysis product of coal, and other hydrocarbons that are in a gaseous or liquid state.

As used herein, the terms "produced fluids," "reservoir fluids" and "production fluids" refer to liquids and/or gases removed from a subsurface formation, including, for example, an organic-rich rock formation. Produced fluids may include both hydrocarbon fluids and non-hydrocarbon fluids. Production fluids may include, but are not limited to, oil, natural gas, pyrolyzed shale oil, synthesis gas, a pyrolysis product of coal, oxygen, carbon dioxide, hydrogen sulfide and water.

As used herein, the term "fluid" refers to gases, liquids, and combinations of gases and liquids, as well as to combinations of gases and solids, combinations of liquids and solids, and combinations of gases, liquids, and solids.

As used herein, the term "injection fluids" means fluids being passed under high pressure from pumps along a high-pressure line. Such fluids may be, for example, fracturing fluids being pumped to a frac tree at a wellbore.

As used herein, the term "wellbore fluids" means water, hydrocarbon fluids, formation fluids, or any other fluids that may be within a wellbore during a production operation.

As used herein, the term "gas" refers to a fluid that is in its vapor phase.

As used herein, the term "subsurface" refers to geologic strata occurring below the earth's surface.

As used herein, the term "formation" refers to any definable subsurface region regardless of size. The formation may contain one or more hydrocarbon-containing layers, one or more non-hydrocarbon containing layers, an overburden, and/or an underburden of any geologic formation. A formation can refer to a single set of related geologic strata of a specific rock type, or to a set of geologic strata of different rock types that contribute to or are encountered in, for example, without limitation, (i) the creation, generation and/or entrapment of hydrocarbons or minerals, and (ii) the execution of processes used to extract hydrocarbons or minerals from the subsurface.

As used herein, the term "red zone" refers to any area of high pressure.

As used herein, the term "fracturing operation" includes an operation where an injection fluid is pumped downhole, through a jetting hose, and then through a hydraulic jetting nozzle for forming small lateral boreholes out into the formation.

As used herein, the term "wellbore" refers to a hole in the subsurface made by drilling or insertion of a conduit into the subsurface. A wellbore may have a substantially circular cross section, or other cross-sectional shapes. The term "well," when referring to an opening in the formation, may be used interchangeably with the term "wellbore." The term "bore" refers to the diametric opening formed in the subsurface by the drilling process.

DESCRIPTION OF SELECTED SPECIFIC EMBODIMENTS

Figure 2:
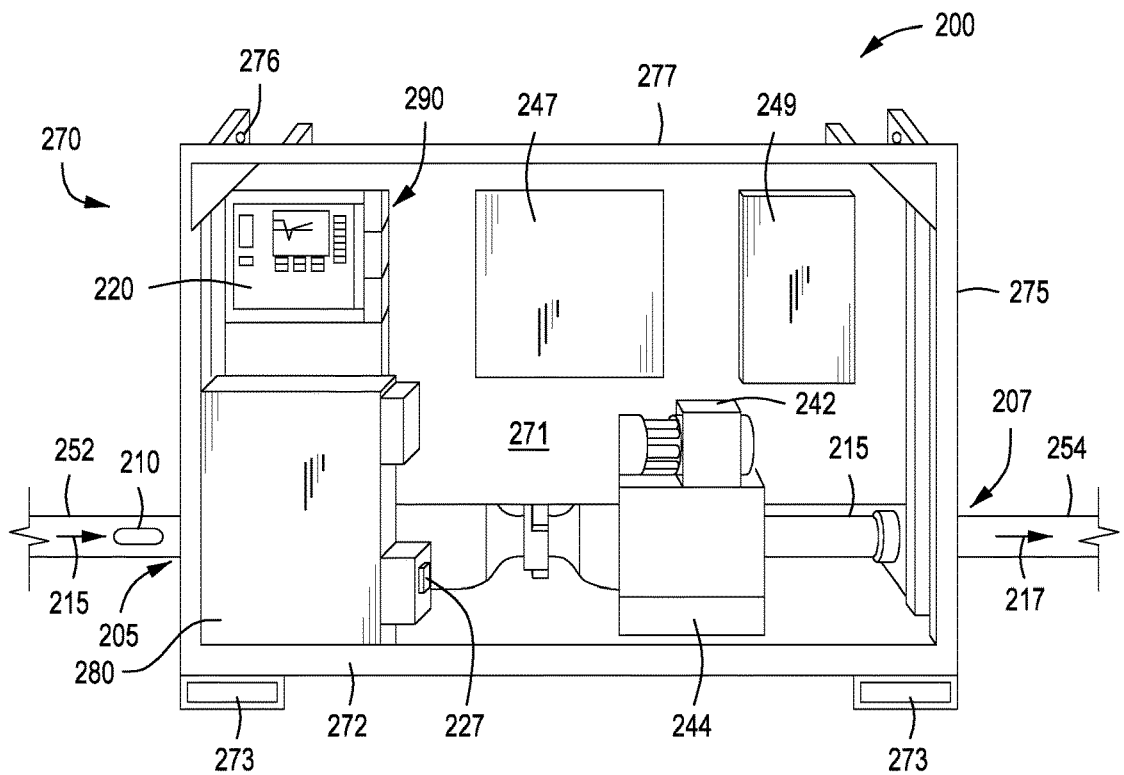
FIG. 2 is a front perspective view of a pressure relief valve system of the present invention, in one embodiment. The pressure relief valve system is mounted onto a platform, or skid, for portability.

FIG. 2 is a front perspective view of a pressure relief valve (or PRV system) 200 of the present invention, in one embodiment. The PRV system 200 is designed to serve as a safety mechanism in connection with a high-pressure fluid injection operation. The PRV system 200 is electronically controlled, and has particular utility in connection with a formation fracturing operation. While the system 200 may be used in connection with other high-pressure fluid pumping systems, it will be described herein primarily in the context of a formation fracturing operation for illustration.

Figure 3:
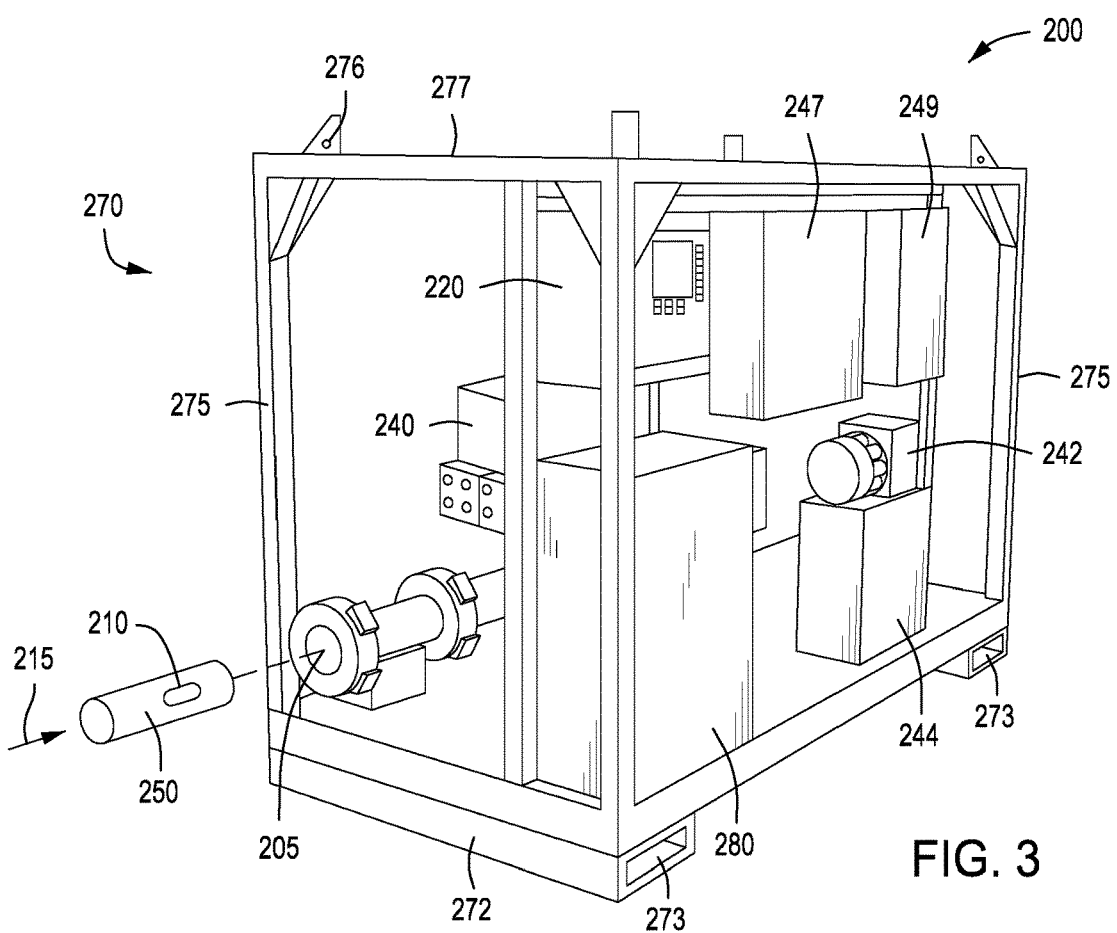
FIG. 3 is another perspective view of the pressure relief valve system of FIG. 2, mounted onto the skid. Here, the view is taken from a left, front corner of the system. Several vertical support beams associated with the skid are visible.

FIG. 3 is another perspective view of the PRV system 200 of FIG. 2, mounted onto a platform, or skid 270. Here, the view is taken from a left front corner of the system 200.

Figure 4A:
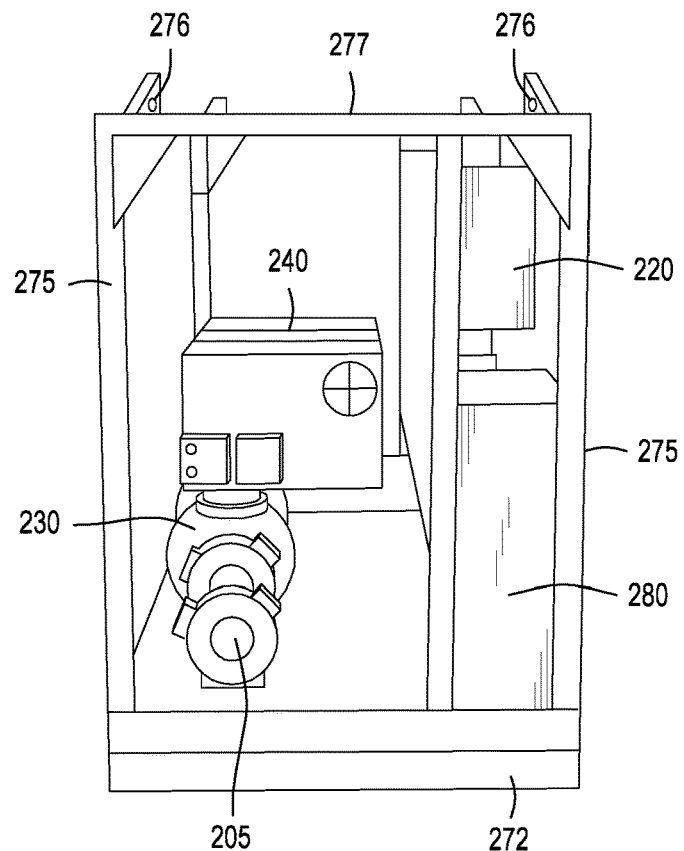
FIG. 4A is still another perspective view of the pressure relief valve system of FIG. 2, mounted onto the skid. Here, the view is take from the left (or fluid inlet) side of the system.

FIG. 4A is still another perspective view of the PRV system 200 of FIG. 2, mounted onto the skid 270. Here, the view is taken from the left side of the system 200. A fluid inlet is shown at 205.

Figure 4B:
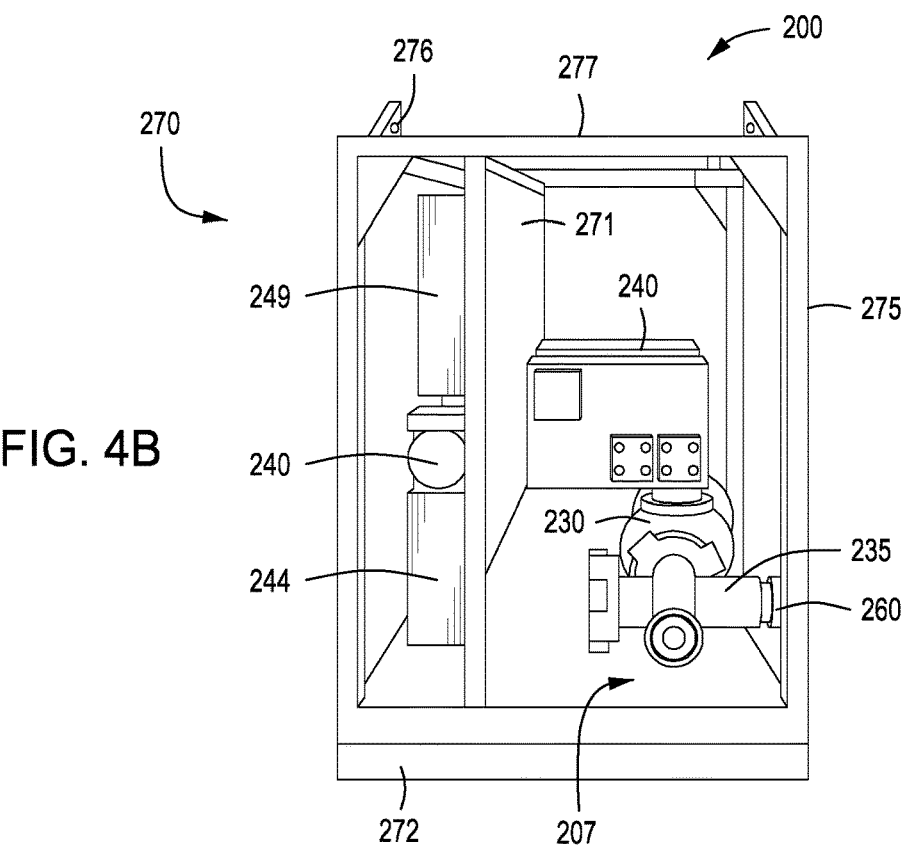
FIG. 4B is a perspective view of the pressure relief valve system of FIG. 2, seen from the right (or fluid outlet) side of the system.

FIG. 4B is a perspective view of the PRV system 200 of FIG. 2, seen from the right side of the system 200. This is the fluid outlet side of the system 200. A fluid outlet is shown at 207.

Figure 5:
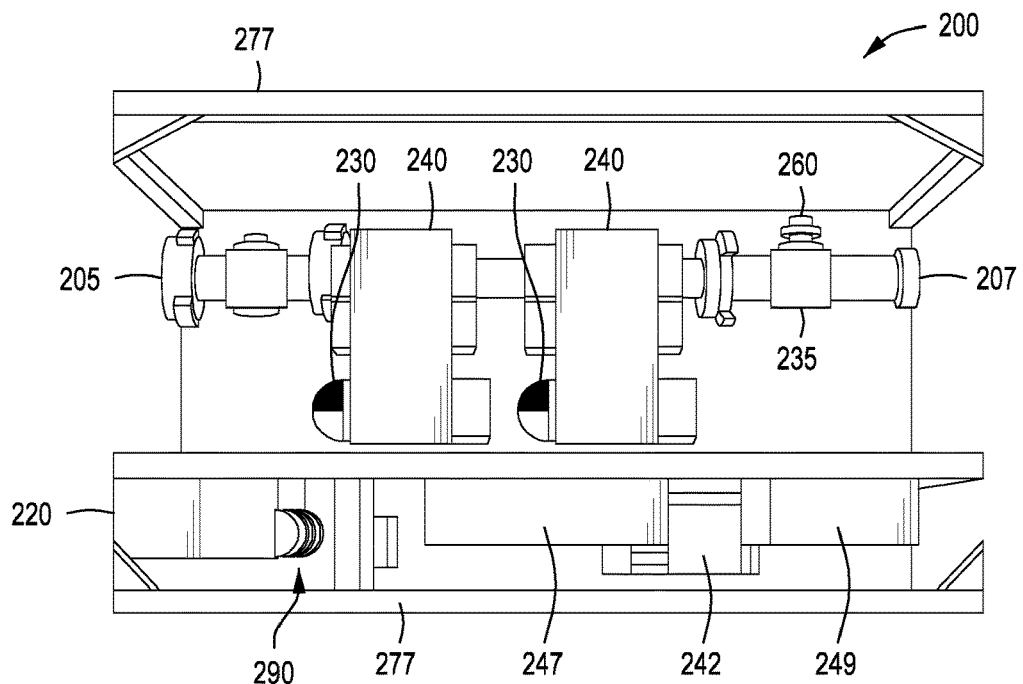
FIG. 5 is a top perspective view of the pressure relief valve system of FIG. 2. A horizontal I-beam associated with the skid is removed for illustrative purposes.

FIG. 5 is a top perspective view of the PRV system 200 of FIG. 2. Here, an I-beam that resides across an upper end of framing forming the skid 270 is removed for illustrative purposes. The I-beam may be seen in FIGS. 8 and 13A at 278.

Figure 6A:
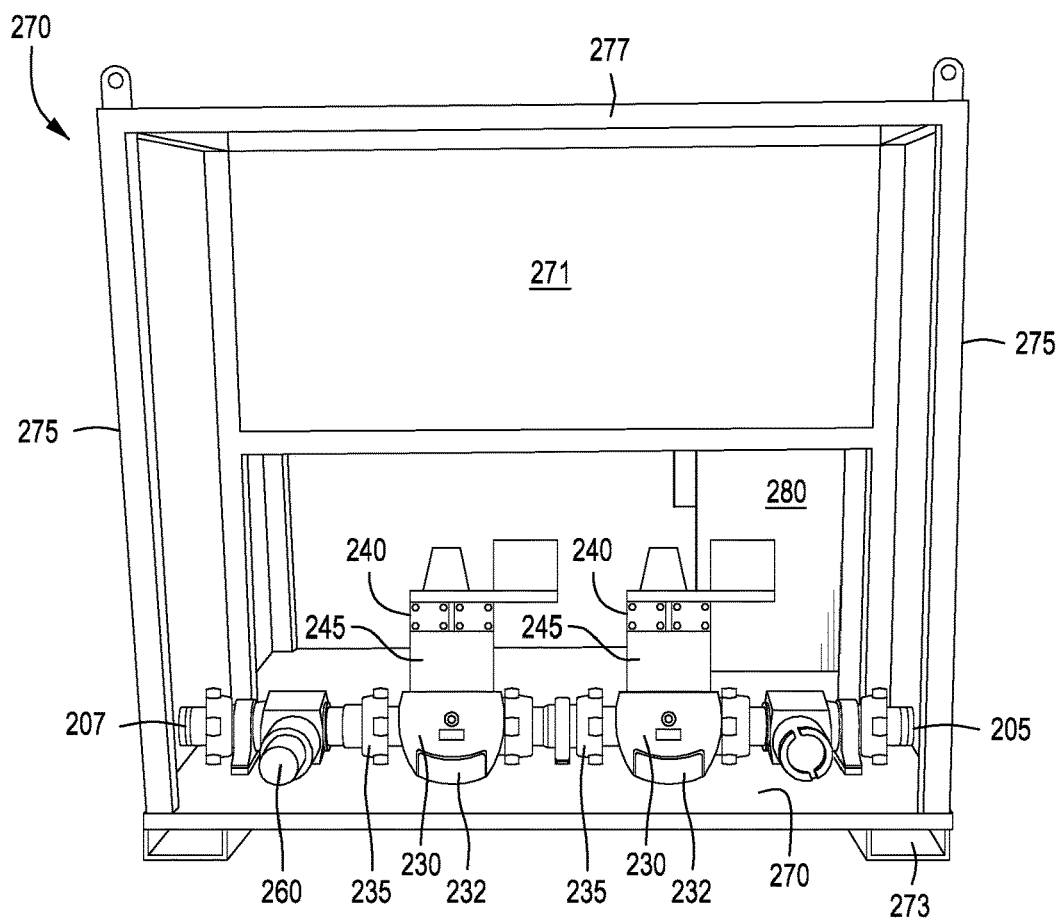
FIG. 6A is still another perspective view of the pressure relief valve system of FIG. 2. Here, the view is take from the rear of the system.
Figure 6B:
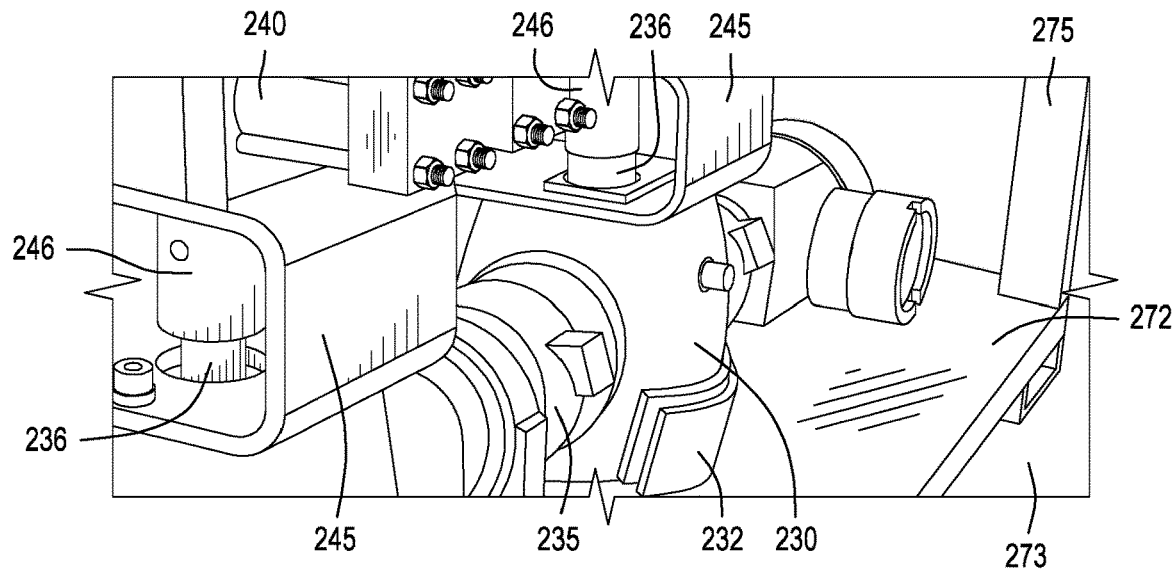
FIG. 6B is an enlarged view of a portion of an actuator residing on a plug valve.

FIG. 6 is still another perspective view of the PRV system 200 of FIG. 2. Here, the view is taken from the rear of the system 200.

The PRV system 200 will be first discussed in connection with FIGS. 2, 3, 4A, 4B, 5 and 6 together.

The PRV system 200 first includes one or more sensors 210. The sensors 210 serve as pressure transducers. Each of the pressure transducers 210 is configured to sense fluid pressure within a fluid injection system. The fluid injection system is preferably a hydraulic fracturing system or a drilling fluid circulation system. The pressure transducers 210 generate electrical signals representative of fluid pressure readings within the fluid injection system. The signals are generated in real time.

In one aspect, each of the one or more pressure transducers 210 is a high-pressure Viatran™ pressure transmitter available from Viatran Corporation of Tonawanda, New York. For example, the Model 570 4-20 mA pressure transmitter may be used. This pressure transmitter is rated p to 100,000 psi. Certain Viatran™ transducers provide for an input of 10.5 to 28 VDC.

In one aspect, the sensor 210 is not a traditional pressure transducer, but is an optical interferometer such as the Sagnac interferometer pressure sensor. The output of a Sagnac interferometer is a signal that is proportional to the time derivative of the pressure signal. Such an output signal can be integrated to produce a time series that can be proportional to the pressure variation as a function of time.

As noted in U.S. Pat. No. 9,874,432 entitled "Optical Pressure Sensor," a Sagnac sensor allows telemetry signal detection to occur without drilling holes in a high-pressure fluid line at a drill site. Sagnac sensors can be placed anywhere on the surface of a flow line to detect the leading and trailing edges of telemetry pulses in the flow line. Data from several Sagnac sensors can be combined to produce a magnified signal. Such an arrangement can also provide for a telemetry encoding scheme that depends on signal edge detection, rather than detecting pressure pulses.

In FIGS. 2 and 3, a single transducer 210 is shown. The transducer 210 is disposed along a fluid inlet line 252. Arrow 215 indicates an inflow of the high-pressure fluids. Preferably, the high-pressure fluids are fracturing fluids. Arrow 215 shows the inflow of the fluids into the FRV system 200 adjacent the pressure transducer 210, while Arrow 217 shows an outflow of the fracturing fluids. Outflow would be caused by a "relief event."

The fluid inlet line 252 may be a part of a high-pressure injection line. Such an arrangement is shown schematically in FIG. 8, wherein the fluid injection line is indicated at 250. In this instance, a relief line 865 is provided. More preferably, the fluid inlet line 250 is a dedicated bypass line that tees off of the fluid injection line 250. This is shown at 252 in FIG. 9. In this instance, a relief line 254 extends from the fluid outlet 207.

In either aspect, the PRV system 200 also includes a system controller 220. The system controller 220 is configured to receive the electrical signals from the one or more pressure transducers 210, and process those signals. Processing includes comparing fluid pressure readings taken by the one or more pressure transducers 210 with a previously-stored pressure threshold. The controller 220 is programmable so that an operator may set the stored pressure threshold to a desired value. The controller 220 may be programmed through a keypad interface or, more preferably, remotely through a laptop computer (shown schematically at "O" in FIG. 12).

The system controller 220 may be a programmable logic controller (PLC), an embedded controller, or any controller suitable for the oil well applications environments. In one aspect, the controller 220 is capable of performing proportional-integral-derivative (PID) loop control or a subset such as PI loop controls. This enables various data signals to be processed and analyzed in real time. If the process controller is a PLC, the programming language is typically ladder logic. In the case of an imbedded controls implementation, the programming software is typically some form of "c" such as c or c++, or perhaps in a version of Basic such as T Basic.

In the arrangement of FIG. 2, the controller 220 is an MDT Data Acquisition Control Computer. In another embodiment, the controller 220 is a Triangle Research EZWire 1616 that provides integrated, field wiring ready I/O terminals. The Triangle Research EZWire 1616 controller is an embedded programmable logic controller (or "PLC") with operations software downloaded thereon. This controller is able to perform advanced floating point math, and has 16 digital inputs and 16 digital outputs.

The controller 220 provides digital and analog I/O points with its own power (+24V or +5V) and 0V on a 3-level screwless terminal. In one embodiment, the controller has eight analog inputs and four analog outputs. Every sensor and actuator in a control system can be wired directly to the PLC without requiring additional screw terminal blocks and wire-harnesses. The PLC may offer an RS485 pinout cable connector.

The controller 220 has an RS232 male header. This serves as a data terminal equipment (DTE) connector. The DTE connector converts user information into signals, or reconverts received serial signals. The controller 220 also has an RS232 female header. This serves as data circuit-terminating equipment DTE connector.

The controller 220 further optionally includes an Ethernet port. The Ethernet port may connect to other devices or web servers for control or data up/downloading. The controller 220 additionally includes a back-up battery (not shown).

The PRV system 200 further includes a fluid inlet 205. The fluid inlet 205 is configured to communicate with fluids moving through the fluid injection line 250 (seen best in FIG. 9, discussed below). Preferably, at least one of the one or more pressure transducers 210 is positioned proximate the fluid inlet 205. The system 200 further includes a fluid outlet 207 for releasing high pressure fluids during a relief event. The system 200 and its fluid inlet 205 and fluid outlet 207 reside adjacent to the fluid injection line 250, connected by a bypass line 252 (seen best in FIG. 9).

The PRV system 200 additionally comprises one or more valves 230. The illustrative valves 230 are plug valves. Each plug valve 230 is configured to rotatably move between a closed state and an open state. In its open state, fluid pressure in the fluid injection system 200 is relieved through the fluid outlet 207. Each plug valve 230 is preferably designed to reside along a 3" line, but this is merely designer's choice.

In one aspect, each plug valve 230 is a ULT plug valve available from FMC Technologies of Houston, Texas. The ULT plug valve is rated to 15,000 psi and is specifically designed to handle or tolerate slick water, sand, proppant/gel and cement chips. Of interest, the ULT plug valve utilizes dual segment seals that reduce erosive fluid flow between the seal segments and the plug valve body.

The PRV system 200 also includes an actuator 240. Specifically, an actuator 240 is provided for each plug valve 230. In one aspect, each actuator 240 resides on top of a corresponding plug valve 230. Each actuator 240 is configured to move its respective plug valve 230 from its closed state to its open state. This is done by rotating a stem (seen in FIG. 13B at 234) in response to an actuation signal from the controller 220. In operation, the controller 220 sends the actuation signal when a fluid pressure reading taken by one of the one or more pressure transducers 210 exceeds the stored pressure threshold. The stem 234 then turns the plug valve 230, moving it to its open position.

In one aspect, the actuator 240 is a REXA Electraulic™ Actuator available from Rexa, Inc. of Houston, Texas. Rexa, Inc. makes both linear and rotary actuators. In the current inventions, the rotary actuator is preferred. In one embodiment, the actuator 240 operates with an associated accumulator 245. The accumulator 245 stores (or is charged with) pressurized hydraulic fluid for activating the actuator 240 and rotating its corresponding valve 230 for at least several cycles.

The accumulator 245, in turn, operates with an accumulator motor 242. The accumulator motor 242 may be referred to as a hydraulic pump and supplies pressure to the accumulator 240. The accumulator 245 thus defines an accumulator reservoir. The accumulator motor 242 is electric while the accumulator reservoir holds a hydraulic fluid. Thus, an "electraulic" actuation system is used, meaning that the actuators 240 are turned by a combination of electric and hydraulic power.

In one aspect, a hydraulic sensor is coupled to the accumulator 245 to monitor the stored charge. The sensor provides indications of the stored charge to the system controller 220 so that the controller 220 can maintain the charge in the accumulator 245 at a desired level. As an example, if the hydraulic sensor detects that the charge in the accumulator 245 drops below a level that is sufficient to activate the actuator 240 and its corresponding valve 230 (e.g., 3,000 psi), then the controller 220 energizes the accumulator motor 242 to re-charge the accumulator 245 with fluid from the reservoir. When the hydraulic sensor detects that the accumulator 245 has been re-charged to a desired level (e.g., 4,550 psi), then the controller 220 de-energizes the accumulator motor 242.

The actuator 240 may have its own controller 247 and associated circuit board. In the example of FIG. 2, the actuator controller 247 is a Rexa Actuator Computer Controller. A Rexa Inverter is shown at 249. The Rexa inverter 249 converts AC power (which is what the actuator 240 runs off of) to DC power. In this way, the system 200 is reliant on two, 100-amp batteries that get charged off of four bank battery chargers. The batteries are not shown, but reside within a battery box 280.

It is noted that in the arrangement of FIG. 2, the system 200 utilizes two plug valves 230 and two actuators 240. Each plug valve 230 is located below a respective actuator 240. Each plug valve 230 will have a stem 234 extending vertically up into the actuator 240. Upon receiving an actuation signal, the actuator 240 will rotate its respective stem adapter (not visible) to move the valve 230 into its open position. Preferably, the rotation is only 90-degrees, and no more than 180-degrees. In this way, each valve 230 may be opened more quickly, such as in less than 1.5 seconds. More preferably, each rotation takes place in less than 0.5 seconds, or even less than 0.3 seconds.

As noted above, existing FRV systems utilize gate valves. Gate valves are slow to cycle due to the high number of revolutions required to translate in and out of the valve opening, creating a high risk of screen-out, a pressure leak or even a catastrophic blowout before the relief valve is fully opened. Existing FRV systems can take as long as 10.0 seconds to open a gate valve. Further, seats within gate valves are highly susceptible to erosion in the presence of the sand-laden fracturing fluid due to the extended length of time it takes to open and close. In contrast, the present PRV system utilizes at least one and, optionally, two plug valves 230, with each plug valve 230 being held on the platform 272 by a seat 232. The actuator 240 is capable of cycling a plug valve 230 in less than 1.5 seconds, and preferably less than one second, greatly minimizing seat exposure to the abrasive fluid. In some instances, a full open/close cycle can take place in 0.5 seconds or even 0.25 seconds. This represents a significant improvement over the prior art.

Beneficially, with a plug valve 230, the system controller 220 may be programmed to send a separate maintenance signal to each plug valve 230. The maintenance signal causes the actuator 240 to initiate incremental movements of the plug valve 230 to allow for proper greasing. This, of course, is done when the fluid injection system is offline or shut down. Such a maintenance signal allows each valve to be fully cycled in no more than one or two seconds, enabling rapid lubrication. Alternatively, a plug valve may be partially rotated, such as a one-quarter turn to place the valve in a half-open/half-closed position.

Optionally, the PRV system 200 comprises a flow meter 235. The flow meter 235 is configured to measure the flow rate of injection fluids when the plug valve 230 is moved to its open state. The flow meter 235 may also calculate total injection fluid volume moving through the flow meter 235 during a plug valve 230 open state condition (or "relief event"). Arrow 865 of FIG. 8 demonstrates a direction of fluid flow during a relief event. Diverted injection fluids are collected in an open retaining pit, or "catch tank" 860.

It is preferred that the PRV system 200 is located at a well site, such as near wellbore 100. For example, the PRV system 200 may be part of a hydraulic fracturing system for a well completion operation. The well site will include one or more chemical tanks, one or more sand bins, one or more water tanks, and a mixer or blender. The well site will further include one or more high pressure frac pumps and a frac tree.

Figure 8:
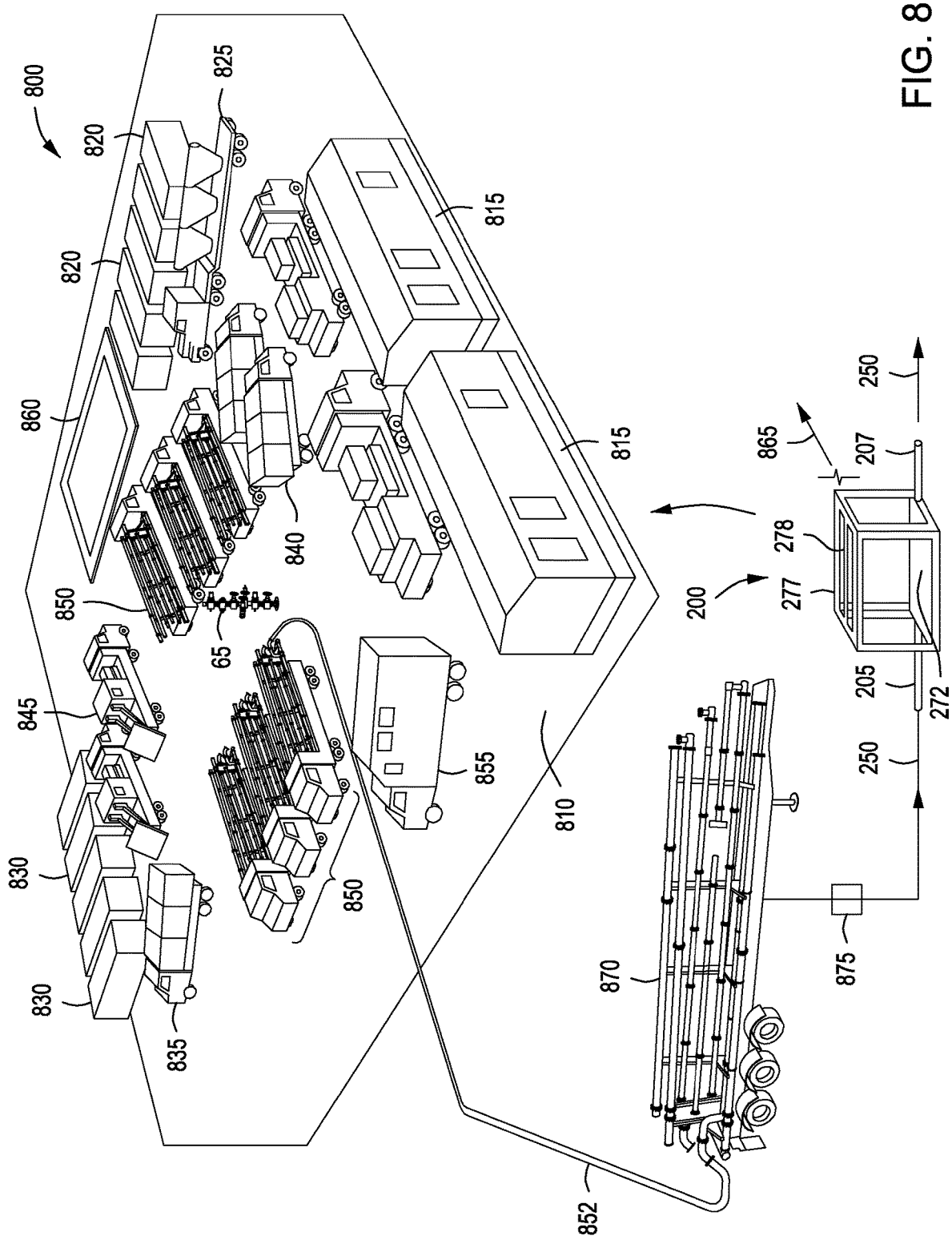
FIG. 8 is a somewhat schematic view of a well site undergoing a high-pressure fluid injection (or fluid pumping) operation, in one embodiment. A high-pressure injection line is shown transporting formation fracturing fluids through a pressure relief valve en route to a frac tree over a wellbore.

FIG. 8 is a schematic view of a well site 800 undergoing a high-pressure fluid injection operation. The well site 800 includes a so-called pad 810, which represents an area where the surface has been prepared for drilling and completion operations. The pad 810 may be, for example, two to four acres in area.

The well site also includes a frac tree 65. The frac tree 65 is disposed over a wellbore (such as wellbore 100) and includes flow control valves for controlling the high-pressure injection of fracturing fluids into the wellbore. The frac tree 65 is intended to represent the frac tree 65 from FIG. 1. It is understood that the current inventions are not limited by the architecture of the well tree.

The well site 800 also includes one or more so-called dog houses 815. These represent areas where service personnel and operators may work and live during the drilling and completion operations. Not every site will include dog houses 815; these are simply provided for completeness of disclosure.

The well site 800 also includes sand storage units 820 that have been brought on location 810. The sand storage units 820 represent large, portable bins that hold proppant used as part of an injection slurry. In one aspect, the sand storage units 820 represent trailers having wheels that are pulled by trucks to the location 800. More preferably, the sand storage units 820 are stationary bins that are filled by sand dump trucks 825. In any instance, a completion operation where multiple wells are undergoing formation fracturing may utilize several hundred sand bind or "sand boxes."

The well site 800 also includes frac storage tanks 830. The frac storage tanks 830 have been brought on location 810 using trucks (not shown). In one aspect, the frac storage tanks 830 represent trailers having water containers that are carried by trucks to the location 800. More preferably, the frac storage tanks 830 are stationary tanks that are filled by water transport trucks 835. In either instance, the tanks 830 contain brine used as the carrier medium for the injection fluid.

The well site 800 also shows that chemical storage trucks 840 have been driven onto the pad 810. The chemical storage trucks 840 carry surfactants or other chemicals (typically referred to as "slickwater") that are mixed with the brine of the frac storage tanks 830 to reduce friction. The chemicals may also optionally include biocides, scale inhibitors and stabilizers as well as guar gum, which is used as a thickening agent. The chemicals are mixed along with the sand into the brine using so-called frac blenders 845.

The well site 800 of FIG. 8 also shows a series of frac pumps 850. Each of the frac pumps 850 is preferably part of a truck that is configured to receive injection fluids from the frac blenders 845, and then send them under high pressure through the high-pressure injection line 250.

It is understood that in an actual hydraulic "fracking" operation, fluids are pumped into different portions of a horizontal wellbore in stages. In addition, a series of different fluids may be pumped into each stage, including for example an acid stage, a slickwater stage (having no proppant), a proppant stage and a flushing stage. This application is not intended to be a primer on hydraulic fracturing, and the person of ordinary skill in the art will be familiar with the fracking process. For purposes of the present disclosure, all of these fluids, individually and together, are consider "injection fluids" or "fracturing fluids."

Injection fluids are received at the PRV system 200, shown somewhat schematically in FIG. 8. Fluid pressures are monitored as fracturing fluids cross the inlet 205 and communicate with the PRV system 200. Line 252 tees off of injection line 250 and places the PRV inlet 205 in fluid (and in pressure) communication with the injection line 250.

If a pressure is detected along the high-pressure injection line 250 (such as at or proximate to the inlet 205) that exceeds the designated threshold pressure, then the plug valves 230 are opened and injection fluids are released through relief line 865. Injection fluids are diverted to an open-pit tank 860 at the pad 810.

It is understood that the pressure relief valve system 200 may, and preferably will, include more than one plug valve 230. It is also understood that the at least one electraulically-actuated valve 230 may be any valve that is actuated through the accumulator motor 242 augmented with hydraulic fluid residing in a fluid reservoir using an actuator 240. This is provided that the actuator 240 is able to open the valve 230 (or rotatably move the valve from a closed state to a full open state) in less than about 1.5 seconds. Examples of suitable alternatives to plug valves are poppet valves and sleeve valves, each of which includes a rotating stem 234.

Preferably, each valve 230 is able to be moved from its full closed position to its full open position with less than one full revolution of a stem 234 by the actuator 940. More preferably, actuation is accomplished through a single 90-degree turn.

Figure 9:
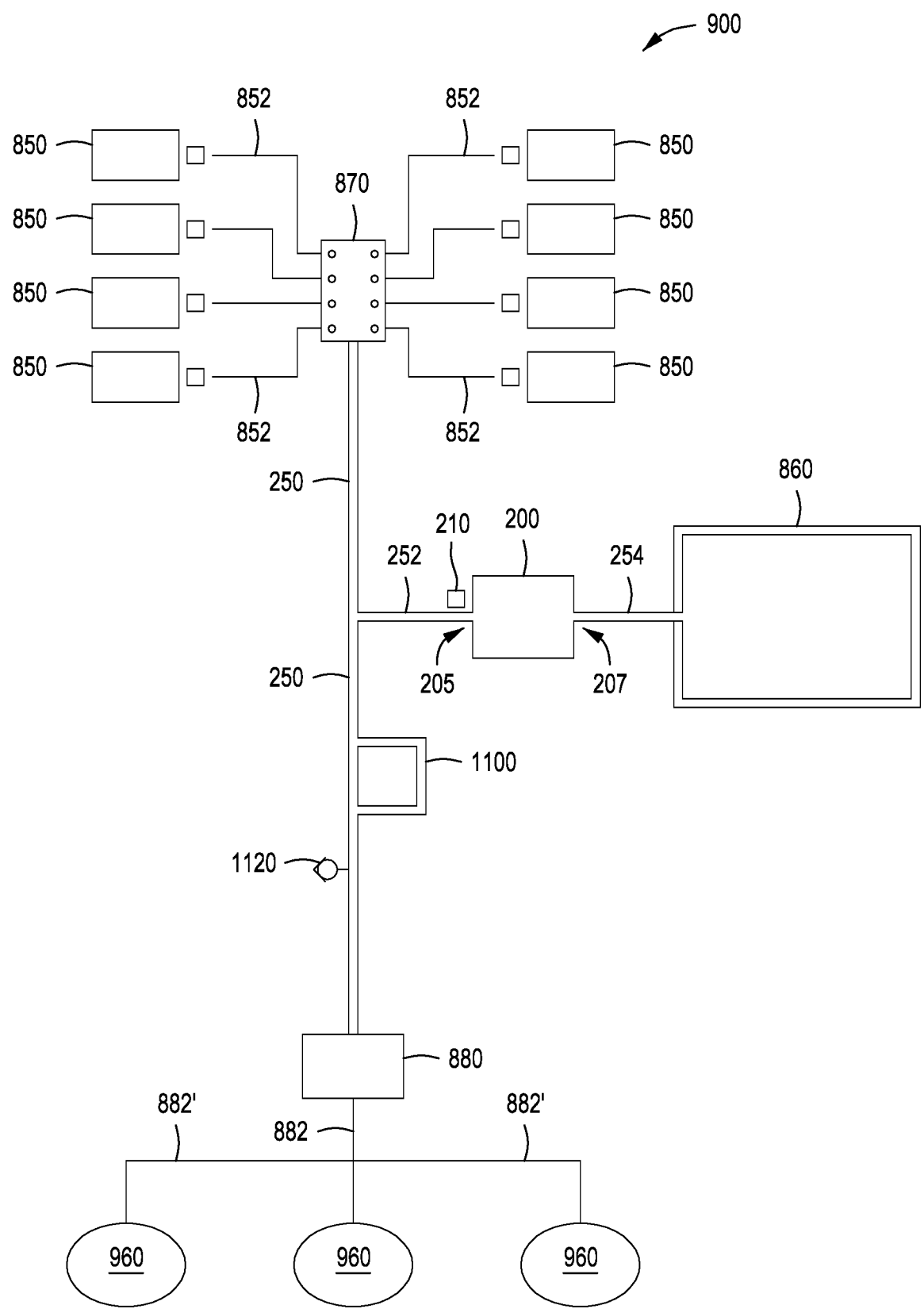
FIG. 9 is a schematic view of a well site wherein multiple wells are placed (or "zippered") at the well site. Individual wells are undergoing formation fracturing operations. Here, both a pressure relief valve and a pressure bleed-off valve are shown along a high pressure frac line.

FIG. 9 is a schematic view of a well site 900 wherein multiple wells 960 are placed at the well site 900. The wells 960 are undergoing formation fracturing operations, meaning the fracturing fluid is being injected into wellbores and formations associated with the respective wells 960. Those of ordinary skill in the art will understand that in some cases multiple wells will be fractured together, in stages, taking advantage of the same frac storage tanks 830 and other equipment at a well site. Illustrative well site 900 does not include all of the components of the well site 800, but only shows the progression of injection fluids from the high-pressure pumping trucks 850.

In FIG. 9, a plurality of pumping trucks 850 is shown. A fluid feed line 852 extends from each pumping truck 850 to a frac missile 870. From there, the injection fluids tee into the high-pressure injection line 250. Injection fluids are transported to a frac manifold 880. Those of ordinary skill in the art will understand that the frac manifold 880 comprises a series of pipes and valves designed to receive injection fluids from the frac missile 870 and then divert them to selected wells 960.

FIG. 9 also shows the placement of the PRV system 200 relative to the fluid injection line 250. It is seen that bypass line 252 places the fluid injection line 250 in fluid communication with the fluid inlet 205 for the PRV system 200. A pressure transducer 210 is located proximate to the fluid inlet 205. Here, the fluid outlet is seen at line 254.

In the preferred arrangement, the high-pressure line 250 extends from the frac missile 870 to a manifold 880. There, the fluid injection line 250 separates into a plurality of distinct injection lines 882, each of which is configured to transport frac fluids to respective frac trees 65 located at wells 960. The frac manifold 880 will include appropriate valves for controlling the flow of frac fluids to selected wells 960. Of course, where only one well 960 is present, then the frac manifold 880 and separate injection lines 882 are not needed. In any instance, the fluid inlet 205 is able to receive injection fluids through bypass line 252.

In the PRV system 200, the system controller 220 is configured to generate an actuation signal to change the state of the one or more plug valves 230 from its close state to its open state. The actuation signal is sent when the controller 220 determines that a pressure in the fluid injection system 200 at the well site 900 exceeds the stored pressure threshold. During operation, the transducer 210 may take 10, or 20, or even 50 pressure readings each second, with each reading being sent to the controller 220 in real time.

In an exemplary embodiment, the controller 220 is configured to generate the actuation signal when the controller 220 determines that the pressure in a fluid injection system exceeds a stored pressure threshold. The controller 220 may be programmed to record a number of relief events, line pressure histories and voltages.

In one aspect, a single reading by a single transducer 210 indicating that pressure in the high-pressure line 250 has met or exceeded the stored pressure threshold will trigger the actuation signal from the system controller 220. A separate signal is then sent by the system controller 220 to the separate controller 247 that controls the actuator(s) 240.

In another aspect, pressure readings taken by the single transducer 210 are recorded by the controller 220 in real time. These pressure readings may then be averaged over time, such as over 0.5 to 3.0 seconds, to smooth out anomalies and to avoid false screen-out indications. The average may be, for example, a moving average, a mode, a median or derived via other averaging technique.

In another aspect, a plurality of transducers take pressure readings simultaneously. Such transducers may be placed along the high-pressure line 250, at the fluid inlet 205, at the frac missile 870, at the frac manifold 880, or combinations thereof. The readings may be averaged by the controller 220 over time, such as by computing a moving average of each separate transducer over 0.5 to 3.0 seconds, or a moving average of the average readings of the plurality of transducers. More preferably, if any one of the transducers records a pressure reading (meaning that an electrical signal indicative of a pressure is sent to the controller 220), that meets or exceeds the stored threshold pressure a single time, then the controller 220 initiates the valve-opening process based on that single reading.

In one embodiment, the PRV system 200 further includes a mechanical pop-off valve 260 (seen in FIG. 4B). The mechanical pop-off valve 260 is located upstream of the plug valve(s) 230, and is configured to open and relieve pressure within the fluid injection system 200 in the event pressure readings taken by one of the one or more pressure transducers 210 reaches a set point greater than the stored pressure threshold, but the plug valve(s) 230 fails to open. This is an additional safety feature.

Preferably, the pressure relief valve system 200 includes on-board batteries. It is understood that the lead line for reference 280 in FIG. 2 is directed to a housing (or battery box) for the batteries, but for illustrative purposes the battery box may also represent the batteries 280. The batteries 280 are configured to provide power to the controllers 220, 247 and to the actuators 240. In one aspect, the batteries 280 provide a 24-volt power source, which comes from two on-board 12-volt batteries. The batteries 280 may be charged using an on-board battery charger that receives power input from a nearby source of power, such as shore power or an onsite generator (not shown).

In one embodiment, a light stack 290 is provided for the pressure relief valve system 200. The light stack 290 gives a visual indicator in real time as to the status of the system 200. For example, the light stack 290 may display different colors for different status readouts. Preferably, the light stack 290 includes a plurality of LED lights and a graphical user interface, wherein the GUI is displays data associated with the pressure relief valve system 200. The data associated with the pressure relief valve system 200 may include, for example, data associated with system pressure measurements obtained by the one or more transducers 210, data obtained by hydraulic pressure measurements associated with the actuator, and an operating status of the actuator 240.

In one aspect of the invention, a high-pressure de-sander 875 is employed at the well site 800. The de-sander 875 resides along the fluid injection line 250, relatively close to the fluid inlet 205. The de-sander 875 may be a gravity de-sander, but preferably is a vertical de-sander such as the SynPOL™ de-sander manufactured by Specialized Desanders Inc. of Calgary, Alberta. Alternatively, the de-sander 875 may be one or more hydro-cyclones such as the Desander Hydrocyclones of Process Group Pty Ltd located in Melbourne, Australia.

In operation, when the system controller 220 issues an actuation signal to the actuator controller 247, an actuation signal is also sent to the de-sander 875. The de-sander then begins to remove proppant from the fluid injection line 250. It is understood that fracturing fluid slurries suspend large volumes of sand (or other proppant material). A de-sander may not be able to remove all, or even a majority of, the proppant from the line 250. However, any amount that is removed will help protect the electraulically-actuated valves 230 from the abrasive high-pressure fluid, saving the operator time and money in connection with valve maintenance.

As can be seen, an electraulically controlled pressure relief valve is provided. The pressure relief valve herein is ideally suited for use in connection with fluid injection operations or formation fracturing operations at a well site. The pressure relief valve is designed to be portable, and may be placed on a skid 270.

Figure 7:
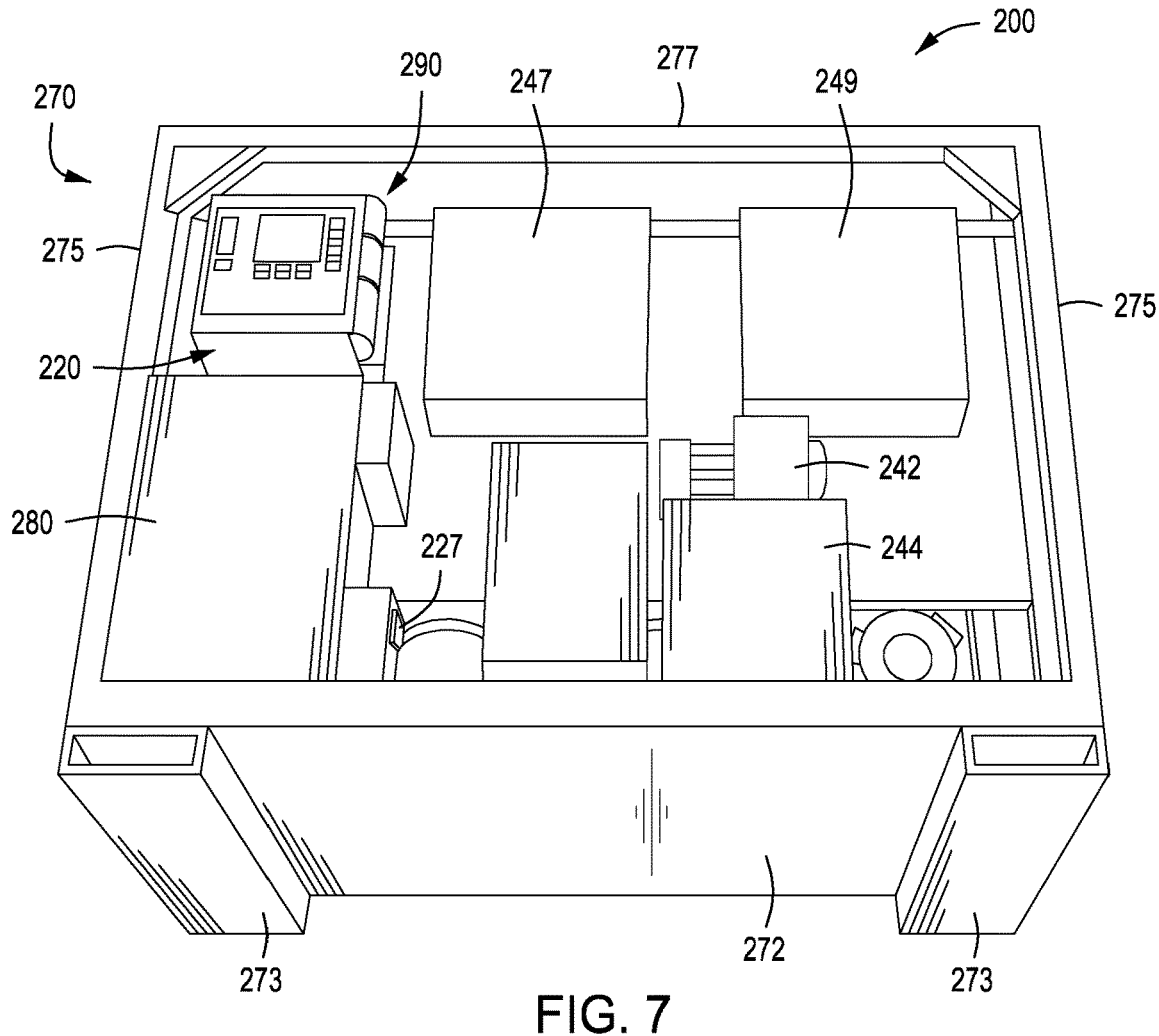
FIG. 7 is a bottom front perspective view of the pressure relief valve system of FIG. 2. The platform and forklift pockets are more clearly seen.

FIG. 7 is a bottom front perspective view of the PRV system 200 of FIG. 2. The skid 270 and the platform 272 are more clearly seen. The skid 270 comprises a platform 272 for supporting components of the PRV system 200. The platform 272 includes a lower space reserved for forklift tines, referred to as forklift pockets 273. The pockets reside along an under-surface of the platform 272.

The skid 270 comprises vertical frame members, or bracing 275, extending up from the platform 272. The skid also comprises lift points 276 configured to enable lifting such as by a chain hoist, sometimes referred to as a "come-along." The skid 270 and associated lift points 276 allow for easy transportation to and from work sites.

In one embodiment of the skid 270, a horizontal I-beam (shown at 278 in FIG. 8) is placed over the platform 272, supported by the vertical frame members 275. The overhead I-beam 278 supports a working line used for lifting the actuators 240 off of the plug valves 230 for purposes of maintenance or replacement. The working line may ride on a trolley system comprised of wheels or bearings for moving the working line laterally along the I-beam 278 and above the platform 272. In this way, the same working line may readily be placed along the I-beam 278 for quickly lifting the actuators 240 up off of the respective plug valves 230 efficiently. This lift system enables plug valves 230 (or poppet valves or sleeve valves as the case may be) to be inspected, serviced, lubricated and cycled in mere minutes, as opposed to the multiple hours required in connection with competing FRV systems.

It is noted that the working line may be a winch line and motor. Alternatively and more preferably, and as discussed further below in connection with FIGS. 13A and 13B, the working line may be a chain hoist (or so-called come-along) that is operated manually. A so-called sky hook is affixed to an end of the chain hoist.

Figure 10:
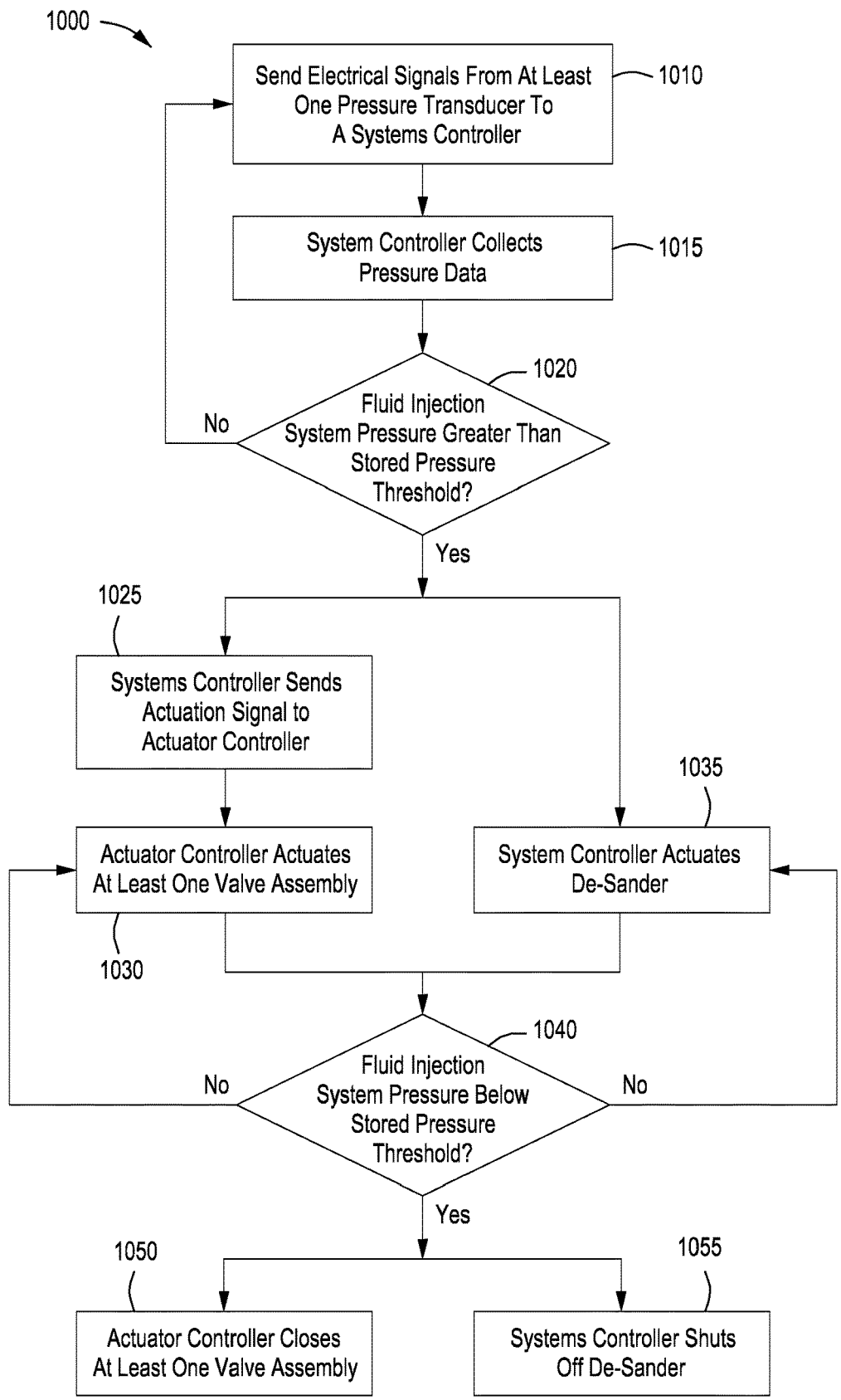
FIG. 10 is a flow chart showing operational steps for the pressure relief valve system of FIGS. 2 through 7, in one embodiment.

FIG. 10 is a flow chart showing operational steps 1000 for the pressure relief valve of FIGS. 2 through 7, in one embodiment. In these steps 1000, signals are first sent from at least one pressure transducer to a system controller. This is shown at Box 1010.

The signals are digital signals indicative of pressure within a high-pressure injection system. Preferably, the signals are generated by a single pressure transducer 210 residing proximate a fluid inlet of the PRV 200. The fluid inlet is in fluid communication with a high-pressure fluid injection line, such as frac line 250. The transducer may take 10, or 20, or even 50 pressure readings each second, with each reading being sent to the controller in real time.

The system controller collects the signals as pressure data. This is indicated at Box 1015. The pressure data is preferably stored in memory for later review and analysis. A memory module (or "machine readable storage medium") associated with the controller may be configured to store pressure data as received, and to selectively convey the stored information as data signals to a computational module.

As signals come into the controller, the computational module, which may be a digital signal processor (or "DSP") will compare pressure readings with a stored pressure threshold value. This is seen at Query 1020. If signals remain indicative of a system pressure below the stored threshold value, then signals continue to be sent from the transducer according to Box 1010 and the plug valves remain in their closed state.

In one aspect, a single reading by a single pressure sensor indicating that pressure in the high-pressure line has met or exceeded the stored pressure threshold will trigger the actuation signal from the system controller. In another aspect, the controller will require a second confirming signal or multiple confirming signals, from one of the at least one pressure sensors within a certain period of time also indicative of pressure greater than the stored value.

In still another aspect, pressure readings taken by the single sensor are recorded by the controller, through the memory module, in real time. These pressure readings may then be averaged by the DSP over time, such as over 0.5 to 3.0 seconds, to smooth out anomalies and to avoid false screen-out indications. The average may be, for example, a moving average, a mode, a median or derived via other averaging technique.

If a pressure value (whether from an individual pressure reading of a single transducer or from a series of pressure readings) is detected as being greater than (or greater than or equal to) the stored pressure threshold, then a signal is sent by the system controller to a separate controller that controls the actuator(s). This is provided at Box 1025. The actuator controller, in turn, sends a signal to the actuator to open the at least one valve assembly. This is seen at Box 1030.

In one aspect, the actuator (such as actuator 240) is able to activate a valve (such as a plug valve 230 in PRV 200) even when the fluid injection line is at a pressure as high as 10,000 psig, or even as high as 15,000 psig. Beneficially, the use of the actuator with a plug valve enables the fluid injection system to continue pumping through the injection line 250 even while the controller issues an actuation signal to open or to close the plug valve. This allows a service company to maintain circulation or injection during relief, avoiding a screen-out condition. This is in contrast to current industry practice wherein the operator must draw down pressure from the frac pumps (sometimes as low as 100 psig) while closing the FRV. With existing FRV systems so-called screen-outs or sand plugs are not uncommon. This long-standing problem is resolved herein using the current FRV system 200 and the steps of flow chart 1000.

In another aspect, the PRV system is equipped with a transceiver. As the controller receives pressure signals, those values are stored in the memory module. The memory module may be on-board, or may be residing remotely such as in a "cloud." In either instance, the transceiver sends stored signals through a wireless communications module, and those signals may be viewed remotely through the use of a computer-based (such as a web-based) application. When the controller receives a signal that exceeds the stored pressure threshold, then a separate signal may be sent to the operator through the application. In this way, the operator (and the operator's customer) are aware of how the job is going in terms of operations pressure at all times.

As an additional and optional feature, when a pressure value is detected as being greater than (or greater than or equal to) the stored pressure threshold, then an optional separate signal is sent by the system controller to a de-sander. This is provided at Box 1035. The de-sander preferably resides along a bypass line between the high-pressure injection line and the fluid inlet of the PRV 200. The de-sander is actuated in order to at least partially remove sand from the frac slurry making up the fluid being injected.

The system controller will continue to monitor signals coming in from the at least one pressure transducer. Query 1040 asks whether the fluid injection system pressure has dropped below the stored pressure threshold. If it has not, then signals continue to be sent in order to cause the actuator controller to keep the valve in their open state. In addition, signals continue to be sent to actuate the de-sander (or, alternatively, no stop signal is sent).

If the fluid injection system pressure does drop below the stored pressure threshold, then the actuator controller closes the at least one valve assembly. This is shown at Box 1050. The step of Box 1050 preferably means that the system controller sends a command signal to the actuator controller, which then causes the actuator to close its associated plug valve.

If the fluid injection system pressure does drop below the stored pressure threshold, then the actuator controller "turns off" the de-sander. This is shown at Box 1055.

In addition to offering a remotely controlled PRV system, the present disclosure also offers a pressure bleed-off system. The pressure bleed-off system may be used in conjunction with the PRV system during a hydraulic fracturing operation at a well site.

Figure 11A:
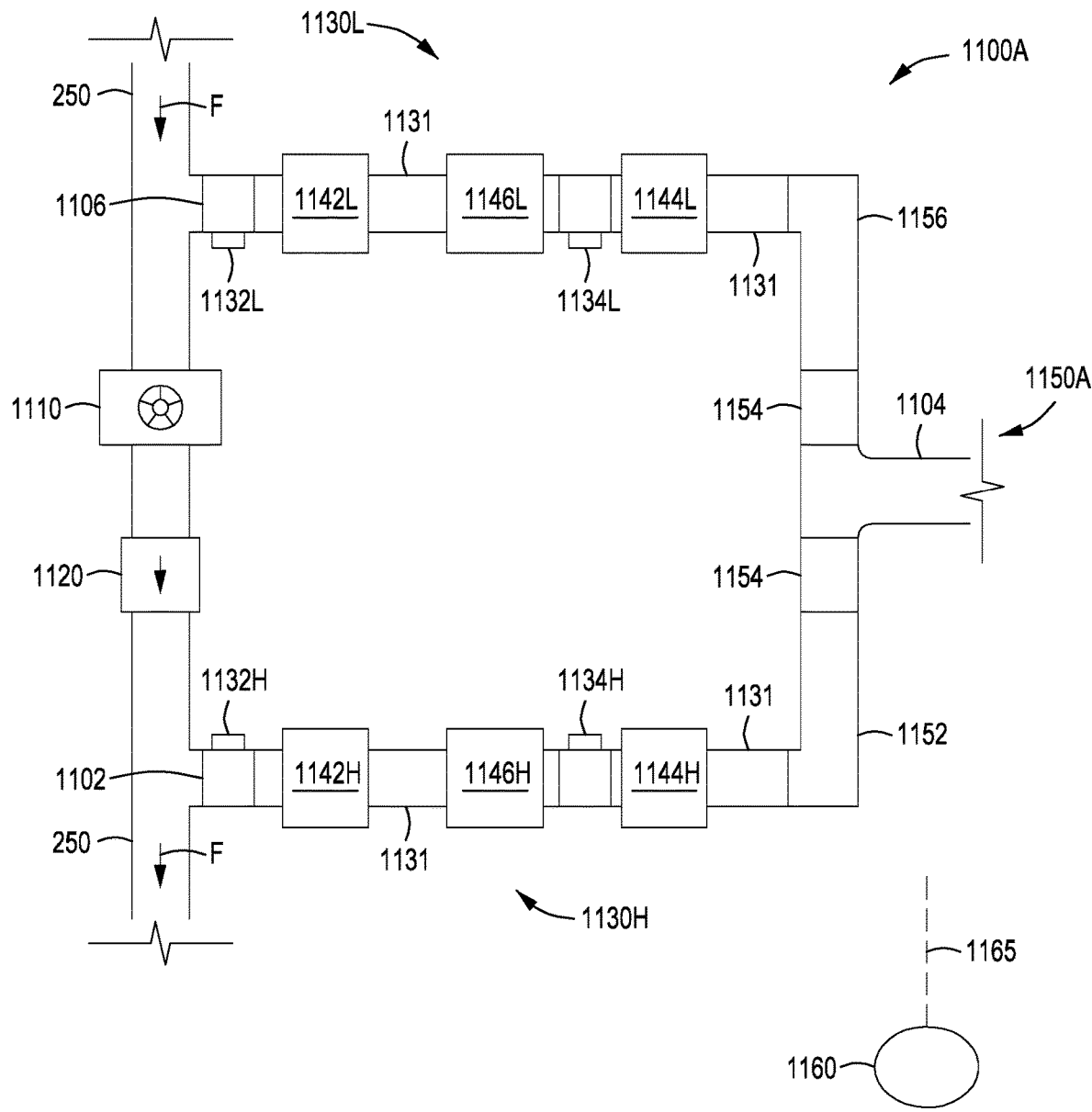
FIG. 11A is a schematic view of a pressure bleed-off system of the present invention, in a first embodiment.

FIG. 11A is a schematic view of an electronically-controlled pressure bleed-off system 1100A of the present invention, in a first embodiment. As shown, the pressure bleed-off system 1100A comprises what might be termed a low pressure line 1130L and a high pressure line 1130H. Each of these lines 1130L, 1130H serves as a fluid bypass line in that fluid can be bypassed from a high pressure frac line. Each of these lines 1130L, 1130H includes a fluid inlet. The fluid inlet for the line 1130L is shown at 1106, while the fluid inlet for line 1130H is shown at 1102.

It is observed that each of the inlets 1102, 1106 is in fluid communication with the high pressure fluid injection line (or "frac line") 250 of FIG. 9. As described above, the frac line 250 is used for a hydraulic fracturing operation. The fluid inlets 1102, 1106 may comprise sized pipe inlets that "neck down" to corresponding plug valves 1142H, 1142L. Alternatively, the fluid inlets 1102, 1106 may comprise set screws used by the operator to manually choke down on the lines 1130L, 1130H. This helps pressure to bleed off more slowly during a pressure bleed operation.

The low pressure line 1130L and the high pressure line 1130H are connected (or are in fluid communication) with each other. This is done by means of a fluid bypass line 1150A. Specifically, an outlet end 1152 of the high pressure line 1130H and an outlet end 1156 of the low pressure line 1130L are connected to the fluid bypass line 1150A. Preferably, each of the connections at the inlets 1102, 1106 to the fluid bypass line 1150A represents a 15,000 psi-rated elbow connection.

A low pressure line transducer 1132U is located proximate the fluid inlet 1106 of the low pressure line 1130L. Similarly, a high pressure line transducer 1132H is located proximate the fluid inlet 1102 of the high pressure line 1130H. These transducers 1132U, 1132H may be 15,000 psi-rated pressure transducers.

A pair of electrically-activated plug valves is placed along the high pressure line 1130H. These represent a first plug valve 1142H and a second plug valve 1144H. Each plug valve 1142H, 1144H may be, for example, a ULT plug valve available from FMC Technologies of Houston, Texas.

The first 1142H and second 1144H plug valves are activated by first and second electric actuators, respectively. The actuators are not shown in FIG. 11A as they reside on top of the plug valves 1142H, 1144H and would cover the plug valves 1142H, 1144H in this view. However, the respective electric actuators are shown at 1172 and 1174 in the embodiment of FIG. 11B.

Similarly, a pair of electrically-activated plug valves is placed along the low pressure line 1130L. These represent a third plug valve 1142L and a fourth plug valve 1144L. The third 1142L and fourth 1144L plug valves are activated by third and fourth respective electric actuators (such as 1172 and 1174 also shown in FIG. 11B).

The plug valves 1142H, 1144H, 1142L, 1144L may be provided by S.P.M. Flow Control, Inc. of Fort Worth Texas. S.P.M. Flow Control sells SPM® frac pumps and valves. Alternatively, the plug valves 1142H, 1144H, 1142L, 1144L may be provided by FMC Technologies, Inc. of Houston, Texas. FMC Technologies provides various flowline products and fluid control technology.

Returning to FIG. 11A, each of the electric actuators 1172, 1174 resides on its associated plug valve 1132, 1144. The electric actuators 1172, 1174 are configured to rotate an associated plug valve 1132, 1144 between close and open positions. This is done in response to command signals sent from a controller 1160. The controller 1160, in turn, sends certain command signals in response to control instructions provided by the operator. In this way, the valves 1142, 1144 may be selectively opened and closed by an operator using wired or wireless communication signals from a remote location, that is, remote from the pressure bleed-off system 1100A. The system 1100A allows an operator to bleed off the frac line 250 without a field hand entering the so-called red zone, that is, an area where the frac iron is under extreme high pressure.

A fluid outlet 1104 is also provided for the pressure bleed-off system 1100A. Line 1104 serves as an outlet line placing the high pressure line 1130H in fluid communication with the low pressure line 1130L. During a bleed-off operation, fluids are released from the bleed-off system 1100A through the fluid outlet 1104. In the arrangement of FIG. 11A, the fluid outlet 1104 is located along the bypass line 1150A between outlet ends 1152 and 1156. However, it is understood that the fluid outlet 1104 may be placed anywhere beyond the plug valves 1142H, 1144H of the high pressure line 1130H.

As noted, the pressure bleed-off system 1100A also includes a controller 1160. The controller 1160 is configured to send command signals 1165 to each of the actuators 1172, 1174 on the high side 1130H to open and close their respective plug valves 1142H, 1144H. This is done in response to the operator sending a Bleed-Off signal. Preferably, the respective plug valves 1142H, 1144H are opened in a desired sequence wherein the second plug valve 1144H is opened at least partially before the first plug valve 1142H.

The controller 1160 may be from Mobile Data Technologies Ltd. of Alberta, Canada. Mobile Data Technologies provides controllers for frac pumps, frac fluid blenders, well site chemical units and even data vans.

Note that during bleed-off, the controller need not open the plug valves 1142L, 1144L on the low pressure side 1130L. In addition, the pressure bleed-off system 1100A need not even have the second 1144H and fourth 1144L plug valves. Those are redundant components that may even remain open at all times of operation.

Those of ordinary skill in the art will appreciate that the first plug valve 1142 (or 1142H) is subject to wash-out due to exposure to abrasive fluid under high pressures during a bleed-off operation. This means that the seat along the first plug valve 1142 (or 1142H) will leak, causing a "pressure trap" between the first 1142 and second 1144 plug valves.

While highly unlikely, it is also possible that the first plug valve 1142 could fail. Therefore, it is strongly preferred that the second plug valve 1144 (or 1144H) be provided as part of the system 1100A, though such is optional as well.

In a preferred embodiment, the first high side plug valve 1142H and corresponding electric actuator 1172H reside proximate the high pressure transducer 1132H. At the same time, the first low side plug valve 1142L and corresponding electric actuator 1172L reside proximate the low pressure line transducer 1132L.

Various spacers may be provided between system components. These may include spacers 1131 and spacers 1154. These are essentially tubular bodies threadedly connected into the system 1100A.

In one aspect, the pressure bleed-off system 1100A further comprises a pair of manual plug valves. A first manual plug valve 1146H resides intermediate the first 1142H and second 1144H plug valves along the high pressure line 1130H. Similarly, a second manual plug valve 1146L resides intermediate the third and fourth plug valves along the low pressure line. The first 1146H and second 1146L manual plug valves are offered as back-up in the event the source of electrical power at the well site 800 should fail.

The fluid inlet 1102 of the high pressure line 1130H and the fluid inlet 1106 of the low pressure line 1130L straddle (i) a one-way check valve 1120. The one-way check valve 1120 only permits fluids to flow in a direction from the fluid inlet 1106 of the low pressure line 1130L towards the fluid inlet 1102 of the high pressure line 1130H. In this way, the high pressure line 1130H, the low pressure line 1130L, the bypass line 1150A and the fluid outlet 1104 form a wishbone configuration In addition, the fluid inlet 1102 of the high pressure line 1130H and the fluid inlet 1106 of the low pressure line 1130L may straddle (ii) a two-way fluid isolation valve 1110. The isolation valve 1110 resides between the fluid inlet 1106 of the low pressure line 1130L and the one-way check valve 1120. In this configuration, pressure in the frac iron may be bled three ways.

First, well side pressure can be bled off. This means that all pressure from the check valve 1120 down to the frac manifold 880, and on to the frac trees at the well heads 960, and all intermediate frac iron, is bled off. In this instance, the high side plug valves 1142H, 1144H are opened while the low side plug valves 1142L, 1144L are closed.

In this first bleed-off example, the frac system upstream from the check valve 1120 remains under pressure. This allows the operator to determine whether the plug valves 1142L, 1144L on the low side 1130L may be leaking. This is done by monitoring pressure readings of the low side pressure transducer 1132L.

Second, pump side pressure can be bled off. This means that all pressure from the from the check valve 1120 back to the blender 845 is bled off. This will include all frac iron behind the check valve 1120 along with the missile 870 and pump trucks 850. In this instance, the low side plug valves 1142L, 1144L are opened while the high side plug valves 1142H, 1144H are closed.

In this second bleed-off example, the frac system downstream from the check valve 1120 remains under pressure. This allows the operator to determine whether the plug valves 1142H, 1144H on the high side 1130H may be leaking. This is done by monitoring pressure readings of the high side pressure transducer 1132H.

Third, the pressure bleed-off system 1100A can bleed off the entire well site pressure, including everything rigged into the well 100 being fractured. In this instance, both the low side plug valves 1142L, 1144L and the high side plug valves 1142H, 1144H are opened. The isolation valve 1110 may be open or closed.

As noted, the embodiment of the pressure bleed-off system 1100A described above is a so-called "wishbone" configuration. The high pressure line 1130H and the low pressure line 1130L straddle the one-way check valve 1120. In another embodiment, a single fluid bypass line coming off of the high pressure frac line 250 may be used. In that instance, the fluid bypass line has a single fluid inlet and an opposing fluid outlet.

Figure 11B:
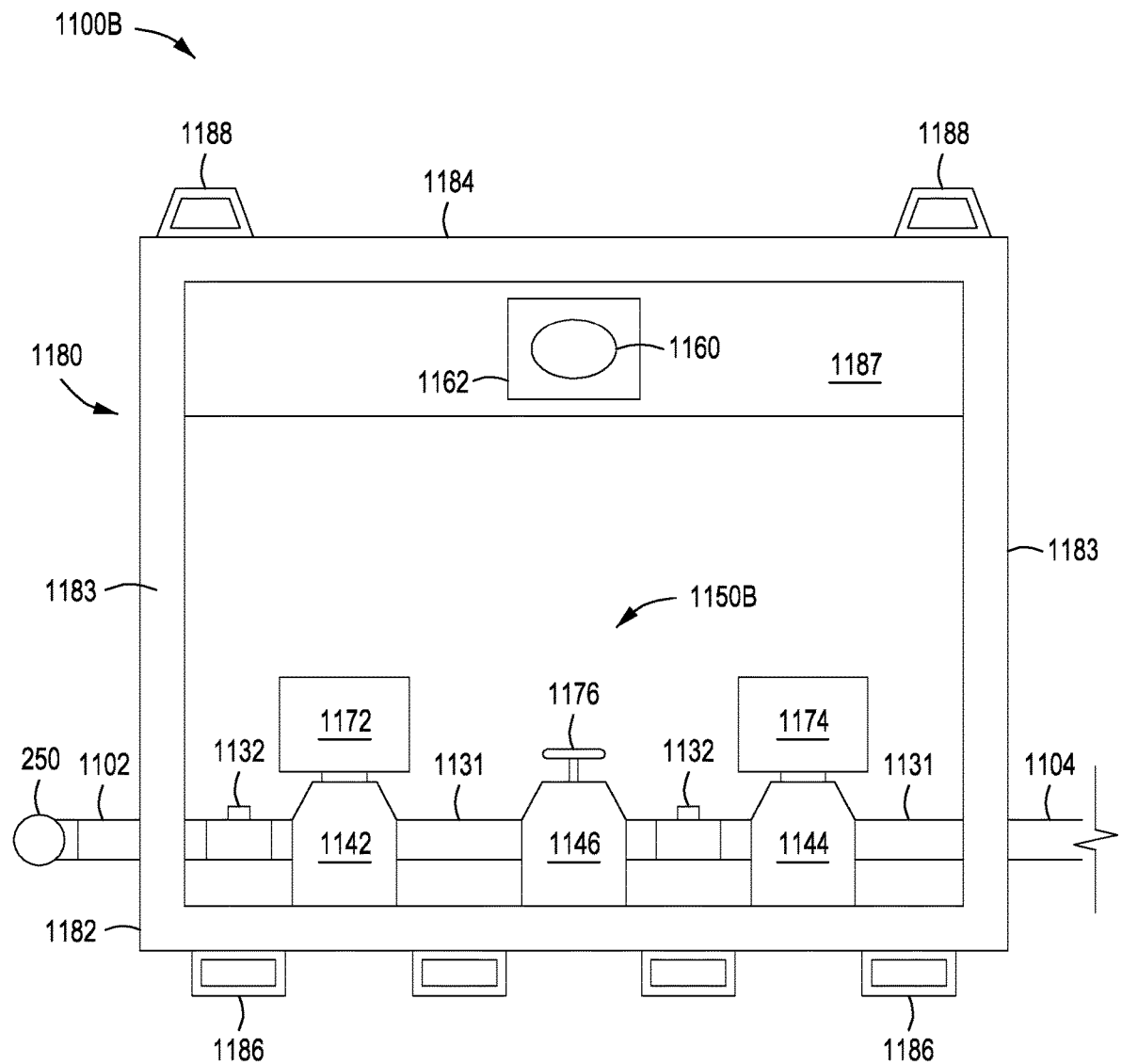
FIG. 11B is a schematic view of a pressure bleed-off system of the present invention, in a second embodiment. Here, the bleed-off system is positioned on a skid for portability.

FIG. 11B is a schematic view of a pressure bleed-off system 1100B of the present invention, in a second embodiment. This system 1100B utilizes a singly bypass line, forming a "straight" bleed-off valve. The pressure bleed-off system 1100B is designed to be portable, and is positioned on a skid 1180. Of course, the system 1100A of FIG. 11A may also be placed on skid 1180 for portability. In any instance, the pressure bleed-off system 1100B is ideally suited for use in connection with formation fracturing operations at a well site.

The pressure bleed-off system of the "straight bypass line" embodiment 1100B has a fluid inlet 1102 and a fluid outlet 1104. Between the fluid inlet 1102 and the fluid outlet 1104 is a fluid bypass line 1150B.

The pressure bleed-off system 1100B also includes a high pressure transducer 1132. The high pressure transducer 1132 is located proximate the fluid inlet 1102. The high pressure transducer 1132 takes pressure readings along the bypass line 1150B continuously and in real time. These readings are sent to a remote data center or to the controller 1160.

The pressure bleed-off system 1100B additionally comprises a first plug valve 1142 and a second plug valve 1144. Each of these plug valves 1142, 1144 resides along the fluid bypass line 1150B, with the first plug valve 1142 being disposed proximate the high pressure transducer 1132. The second plug valve 1144 resides proximate the fluid outlet 1104.

Each of the first 1142 and second 1144 plug valves is moveable between close and open positions. This is done through the use of respective actuators 1172, 1174. Thus, the pressure-bleed-off system 1100B includes a first electric actuator 1172 residing on the first plug valve 1142 and configured to rotate the first plug valve 1142, and a second electric actuator 1174 residing on the second plug valve 1144 and configured to rotate the second plug valve 1144.

Optionally, the pressure bleed-off system 1100B also has a manual plug valve 1146. The manual plug valve 1146 resides intermediate the first 1172 and second 1174 plug valves along the bypass line 1150B. The manual plug valve 1146 is opened or closed using a hand wheel 1176. The manual plug valve 1146 is maintained in a normally-open position and is only closed when electrical power is not available to remotely close the plug valves 1142, 1144.

Additionally, the pressure bleed-off system 1100B comprises a controller 1160. The controller 1160 is configured to send command signals (shown at 1165 in FIG. 11A) to each of the first actuator 1172 and the second actuator 1174 to close or open their respective plug valves 1142, 1144. Preferably, when a control instruction is sent by the operator, the controller 1260 will cause the second plug valve 1144 to be opened before the first plug valve 1142.

Finally, the pressure bleed-off system 1100B may be placed on a skid 1180. Specifically, the skid 1180 supports the fluid bypass line 1150B, the high pressure transducer 1132, the first 1142 and second 1144 plug valves, and the first 1172 and second 1174 electric actuators. In the arrangement of FIG. 11B, the controller 1160 also resides on the skid 1180. Specifically, the controller 1160 resides within a cabinet 1162 secured to a panel 1187 on the skid 1180. In an alternate arrangement, the controller 1160 resides remote from the skid 1180.

The skid 1180 comprises a base, or platform 1182. The platform 1182 supports the components of the bleed-off system 1100B listed above. In addition, the platform 1182 may support spacer pipes 1131. The spacer pipes 1131 are placed along the bypass line 1150B to provide fluid communication between the various components. Ultimately, the fluid inlet 1102 and the fluid outlet 1104 are in fluid communication when the electrically-actuated plug valves 1142, 1144 and the manually-actuated plug valve 1146 are open.

It is observed that the skid 1180 also includes vertical frame members 1183. The vertical frame members 1183 extend up from the platform 1182. The vertical frame members 1183 support horizontal frame members above the bleed-off system 1100B components, including an I-beam 1184 shown above the panel 1187.

With the skid 1180, the pressure bleed-off system 1100B is designed to be portable. To this end, forklift pockets 1186 are spaced apart just below the platform 1182. The forklift pockets 1186 may also be used as feet to support the skid 1180 when it is set down at a well site. In addition, the skid 1180 includes lift points 1188. The lift points 1188 are used to lift the skid 1180 by means of a crane and a winch line (not shown).

As a matter of proportion, the pressure-bleed off system 1100A or 1100B is smaller and lighter than the electrically controlled pressure relief valve 200 described above. The pressure-bleed off system 1100A or 1100B is preferably placed between the pressure relief valve 200 and the frac manifold 880. In both of the arrangements of FIGS. 11A and 11B, the fluid inlet 1102 preferably resides downstream from the one-way check valve 1120. Of interest, the pressure-bleed off system 1100A or 1100B removes the need for burst disks along the frac pumps.

It is noted that for the bleed-off system 1100B, only a single electrically-actuated plug valve 1142 (and associated actuator 1172) is required. However, the second electrically-actuated plug valve 1144 and the manual plug valve 1146 are highly preferred as back-ups for safety reasons.

In addition to the two pressure bleed-off systems 1100A, 1100B described above, a pressure control system 1200 for a hydraulic fracturing operation at a well site is provided herein. In the system 1200, a single operational controller 1260 controls the actuation of valves for both the pressure relief valve 200 and the pressure bleed-off valve 1100A or 1100B. In this arrangement, common software is used to control both the pressure relief valve 200 and the pressure bleed-off valve 1100A or 1100B.

Figure 12:
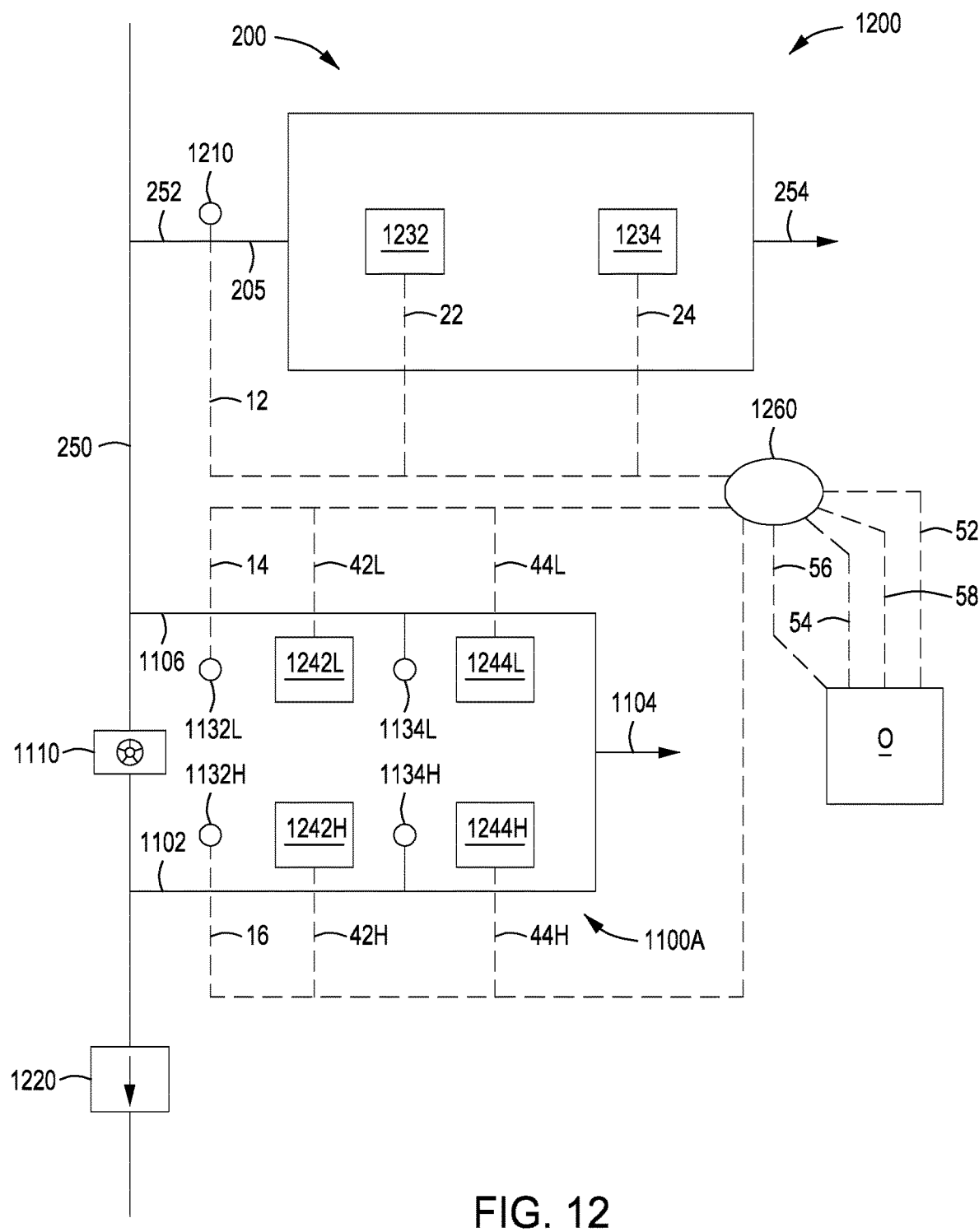
FIG. 12 is a schematic view of a pressure control system for a hydraulic well fracturing operation. A single system controller controls the plug valves for both a pressure relief valve and a pressure-bleed-off system.

FIG. 12 is a schematic view of a pressure control system 1200 for a hydraulic well fracturing operation. Here, a single system controller 1260 controls plug valves for both the pressure relief valve 200 and the pressure-bleed-off system 1100A. The controller 1260 may again be an MDT Data Acquisition Control Computer.

As shown in FIG. 12, the pressure control system 1200 is associated with and is in fluid communication with the high pressure frac line 250. The frac line 250 includes a one-way check valve 1220. Here, the one-way check valve 1220 resides downstream from the pressure control system 1200 and prevents fracturing fluids or other fluids injected into a wellbore 100 from flowing back to the pressure control system 1200. Alternatively, the one-way check valve 1220 may be moved up the high pressure frac line 250 between two-way valve 1110 and high-pressure inlet 1102 as shown in FIG. 11A.

In addition to the shared controller 1260, the pressure control system 1200 includes a pressure relief valve system 200. The pressure relief valve 200 is in accordance with the PRV system 200 of FIGS. 2, 3, 4A-4B, 5 and 6A-6B. Two plug valves are shown at 1232 and 1234. It is understood that each of these plug valves 1232, 1234 is moved between close and open positions using the electro-hydraulic actuators 240 described above.

Fluid inlet line 252 connects the pressure relief valve system 200 to the frac line 250. A sensor 1210 resides along the fluid inlet line 252, or otherwise proximate the inlet 205 for the pressure relief valve 200. The sensor 1210 serves as a pressure transducer, sending signals indicative of pressure in fluid inlet line 252 to the controller 1260, in real time. The pressure signals are indicated by dashed line 12.

The pressure control system 1200 also includes the pressure bleed-off valve 1100A. The pressure bleed-off valve 1100A is in accordance with the pressure bleed-off system 1100A of FIG. 11A. (It is understood that pressure bleed-off system 1100B could alternatively have been shown) Two plug valves are shown at 1242L and 1244L. These serve as control valves for the low pressure side 1130L. In addition, two plug valves are shown at 1242H and 1244H. These serve as control valves on the high pressure side 1130H. It is understood that each of these plug valves 1242L, 1244L, 1242H and 1244H is moved between open and closed positions using electric actuators 1172 or 1174 as described above.

A two-way valve 1110 is placed along frac line 250. As noted above, the two-way valve 1110 resides between the low pressure side and the high pressure side of the pressure bleed-off system 1100A. The two-way valve 1110 is normally open but may optionally be closed by an operator manually before plug valves 1242H and 1244H are opened to bleed off well pressure.

The bleed-off system 1100A includes a pair of pressure transducers 1132L, 1132H. One pressure transducer 1132H resides on the high pressure side 1130H proximate the fluid inlet 1102. The second pressure transducer 1132L resides on the low pressure side 1130L proximate the fluid inlet 1106. The pressure transducers 1132H, 1132L send signals indicative of pressure in fluid inlets 1102 and 1106, respectively, to the controller 1260, in real time. The pressure signals are indicated by dashed lines 14 and 16.

As noted above, PRV system 200 includes a fluid outlet 254. Similarly, the pressure bleed-off valve 1100A includes a fluid outlet 1104. Fluid outlet 254 carries frac fluids to the open retaining pit 860 in the event of an emergency fluid release. Similarly, fluid outlet 1104 carries frac fluids to the open retaining pit 860 during a pressure bleed-off event.

The controller 1260 monitors pressure signals 12 sent by pressure sensor 1210. If a sensed pressure exceeds a stored pressure threshold, the controller 1260 will send an actuation signal to the pressure relief valve 200. Actuation signals are shown at dashed lines 22 and 24. The actuation signals 22, 24 will cause the actuators (not shown in FIG. 12) to open their respective plug valves 1232, 1234. Of interest, the operator may enter a psi value into the controller 1260 using operator computer "O" as a Human-Machine Interface. That psi value may also be stored as the threshold value for prompting an automatic opening of the pressure bleed-off system 1100A or 1100B.

The controller 1260 also monitors pressure signals 14 and 16 from the low 1132L and high 1132H pressure side pressure transducers. If a sensed pressure exceeds a stored pressure threshold, the controller 1260 will again send an actuation signal to the pressure relief valve 200. The actuation signal will cause the actuators 240 to open their respective plug valves 1232, 1234.

Alternatively, if a sensed pressure signal at the fluid inlet 1102 exceeds a stored pressure threshold, the controller 1260 may send an actuation signal to the actuators (shown at 1172 and 1174 in FIG. 11B) to open the plug valves 1242H, 1244H on the high side 1130H. Actuation signals 42H, 44H are shown, indicating command signals for opening and closing plug valves 1242H and 1244H, respectively.

Similarly, if a sensed pressure signal at the fluid inlet 1106 exceeds a stored pressure threshold, the controller 1260 may send an actuation signal to the actuators (shown at 1172 and 1174 in FIG. 11B) to open the plug valves 1242L, 1244L on the low side 1130L. Actuation signals 42L, 44L are shown, indicating command signals for opening and closing plug valves 1242L and 1244L, respectively.

It is noted that the electrically-controlled plug valves 1242L, 1244L, 1242H, 1244H in the pressure bleed-off system 1100A are not configured to open nearly as quickly as the electraulically-controlled plug valves 1232, 1234 in the pressure relief valve 200. In addition, inlet lines 1102, 1106 in the pressure bleed-off system 1100A are likely smaller than inlet line 252 in the pressure relief valve 200. Indeed, the overall footprint of the pressure bleed-off system 1100A or 1100B is smaller than the footprint of the pressure relief valve 200. The pressure bleed-off system 1100A or 1100B is typically fabricated from smaller and less expensive components. In one aspect, a pressure bleed-off event takes 20 to 30 seconds. (As discussed above, the plug valves 230 open in under 1.5 seconds.) This slower time for the pressure relief valve 1100A or 1100B is intentional, minimizing abrasive wear on plug valve seats during a bleed-off event. Therefore, if an emergency pressure state is sensed, it is preferred that the controller 1260 open the plug valves 1232, 1234 of the pressure relief valve 200 rather than, or at least in addition to, opening the plug valves 1242H, 1244H of the pressure bleed-off system 1100A (or plug valves 1242, 1244 of system 1100B).

The primary purpose of the pressure bleed-off system 1100A or 1100B in the present disclosure is to allow the operator to remotely monitor and control the system 1100A or 1100B and to send remote signals for bleed-off. In FIG. 12, an operator computer is shown schematically at "O". "O" may represent a laptop computer or other portable processing unit used by the operator. Alternatively, "O" may represent a mobile data system as might reside on a company van. Alternatively still, "O" might represent a desktop computer residing at the operator's field office or other remote location.

In FIG. 12, a series of dashed lines 52, 54, 56 is presented. These indicate communication links extending from the operator's computer "O" to the controller 1260. Dashed line 52 indicates a communications link between the operator's computer "O" and the controller 1260. The communications link 52 is preferably a wireless communication provided through a cellular network or other wireless network. Alternatively, the communications link 52 may be an Internet connection or a Blue tooth signal. In any event, the communications link 52 enables the operator to determine system status. System status includes, for example:

the state of a plug valve, that is, is a plug valve in an open state or in a closed state, or perhaps in an intermediate position;

the state of a battery, that is, what is the percentage of charge remaining for a battery; and measurements of pressure transducer 1132L, 1132H, wherein an unexpectedly high reading in transducer 1132L could indicate a leak in two-way valve 1110;

the state of software, including performing upgrades remotely; and measurements of pressure transducers 1134L, 1134H, wherein an unexpectedly high reading in transducer 1134H could indicate a leak in plug valve 1242H, and an unexpectedly high reading in transducer 1134L could indicate a leak in plug valve 1242L.

The second 54 and third 56 communications links relate to the actuation of the electric actuators (shown at 1172 and 1174 in FIG. 11B). Two different options are available to the operator. A first option, indicated by signal 54, is a so-called "Safe Bleed" signal. In this option, the operator pushes a single button or enters a single command in connection with the operator's system "O", automatically actuating the pressure bleed-off system 1100A or 1100B to fully open the plug valves 1142 and 1144. This may be done, for example, at the end of a perf-and-frac stage in the wellbore 100.

In the case of system 1100A, plug valve 1144H is opened before plug valve 1142H. This assumes that plug valve 1144H is already closed or is even present, which may or may not be the case. In the case of system 1100B, plug valve 1144 is opened before plug valve 1142. Again, this assumes that plug valve 1144 is already closed or is even present, which may or may not be the case.

After the pressure has been bled off of the valves at the frac tree 65 and the frac line 250, such as at the end of a perf-and-frac stage, the pressure bleed-off system 1100A or 1100B is returned to its closed state. The operator will check to make sure the pressure values being generated from transducer 1132H are at substantially "Zero." The operator may then enter a single "Safe Close" command using the operator computer "O". The controller (or CPU) 1160 will then send new command signals to the electric actuators 1172, 1174 to completely close the plug valves 1172, 1174. Preferably, plug valve 1172 (as the plug valve closest to the inlet 1102) is closed before plug valve 1174 (as the plug valve closest to the outlet 1104).

The second option is indicated by signal 56. This is a so-called "Smart Bleed" signal. In this option, the operator enters a command in connection with the operator's system "O", automatically actuating the pressure bleed-off system 1100A or 1100B to fully open the plug valve 1144 but to only partially open the plug valve 1142.

In the case of system 1100A, plug valve 1144H is fully opened before plug valve 1142H. This assumes that plug valve 1144H is already closed or is even present, which may or may not be the case. Plug valve 1142H is then partially opened according to operator instructions. In the case of system 1100B, plug valve 1144 is fully opened before plug valve 1142. Again, this assumes that plug valve 1144 is already closed or is even present, which may or may not be the case. (The system 1100B works acceptably well with only plug valve 1142.) Plug valve 1142 is then partially opened according to operator instructions.

When opening plug valve 1142, the operator may wish for the plug valve 1142 to be open only 75%, or perhaps only 50%, or perhaps open only 25%. In this way, the plug valve 1142 acts as a primary valve that serves to choke the bleed-off system 1100A, thereby providing a desired psi.

Optionally, the operator may enter commands into system "O" to cyclically open the plug valve 1142 a small percentage (such as 25%), then close the plug valve 1142 completely, then open the plug valve 1142 a slightly large percentage (such as up to 50%), and then again close the plug valve 1142 partially or completely. This may be, for example, in connection with a process of surging the well—a process used to remove sand and debris from the well during completion operations. During this operation, plug valve 1144 remains completely open.

It is noted that in known operations for well surging, a field hand will go into the red zone and manually open a valve using a 5-foot bar. Alternatively, a valve may be opened by hand by manually turning a hand wheel. Either approach causes a pressure dump to occur. Those of ordinary skill in the art will readily understand that such a process carries a risk due to the extremely high fluid pressure residing in the valve and iron connections. The present system 1200 allow the operator to conduct a surge operation remotely, that is, the "Smart Bleed" process, such as from a data van.

To effectuate the "Smart Bleed" process, the actuators 1172, 1174 may be electric actuators provided by Rexa, Inc. of Houston, Texas. These actuators may operate in response to a 4-20 mAmp signal. A percentage value entered into the operator computer "O" equates to a valve position. Thus, a 25% value may equate to placing a valve in a state of being 25% open. The Rexa® actuators 1172, 1174 are preferably r10 rated, meaning that operate at 10,000 inch-lbs (or 833.33 foot-lbs) of pressure. Of course, the pressure rating for the actuators 1172, 1174 is a matter of engineer's choice. The operator may select r20 or r50 Rexa® actuators.

The Rexa® actuators may operate off of AC power. At the same time, the power used by other components at the well site are likely DC power. Therefore, a Rexa® inverter (not shown) may be placed on the pressure bleed-off system 1100A or 1100B. The inverter converts the DC power to AC power.

The pressure bleed-off system 1100A or 1100B may also be used as a back-up to the pressure relief system 200. For example, in the highly unlikely event that a runaway pump will not shut off at the well site 900, or someone closes a well while the pumps are pumping, and the pressure relief valve 200 fails to operate, the controller 1260 will send command signals to the plug valves 1142H, 1144H automatically. To this end, the controller 1260 receives digital pressure signals from the sensors 1132L, 1132H. Upon receiving a signal indicative of a pressure level that is above a pre-set pressure level, such as 15,000 psi, the controller 1260 will initiate the process that causes plug valves 1142H, 1144H to fully open. This is done without a field hand having to enter the red zone and manually open the valves.

Where two separate controllers are used, communications cabling is provided between the controller 247 for the pressure relieve valve 200 and the controller 1160 for the pressure bleed-off system 1100A or 1100B. This allows the pressure relieve valve 200 and the controller 1160 to communicate with one another, but using separate software. For example, if an emergency pressure condition is detected by any of pressure transducers 210, 1132L or 1132H, the controller 247 for the pressure relieve valve 200 will initiate actuation of the actuators 240 for the pressure relieve valve 200, causing the plug valves 230 to quickly open.

In one aspect, both the plug valves 230 for the pressure relief valve 200 and the plug valves 1132, 1144 for the pressure bleed-off valve 1100A or 1100B are all opened, essentially simultaneously. This may be referred to as an E-Kill feature. Optionally, a button is provided on the operator computer "O" for E-Kill. The E-Kill button may be pressed in the event of an emergency, causing an E-Kill signal 58 to be sent to the controller 1260.

One benefit of the pressure bleed-off system 1100A or 1100B is the ability to detect a leak in the plug valve 1142 closest to the inlet 1102. This is done by digital readings taken by the intermediate pressure transducer 1134 (or 1134H). If the plug valve 1142 is leaking, pressure will build up between the plug valve 1142 closest to the inlet 1102 and the plug valve 1144 closest to the outlet 1104. The operator can then service plug valve 1142.

Using the pressure relief valve system 200 and the pressure bleed-off system 1100A or 1100B, novel methods for controlling pressures during a wellbore operation are provided herein. The methods have particular utility in connection with a formation fracturing operation. Formation fracturing includes traditional hydraulic fracturing of injection fluids through perforations or through ported collars downhole. Formation fracturing also includes the injection of fluids into a wellbore through a small-diameter hose having a connected jetting nozzle, wherein the hose is advanced into the formation to formal lateral boreholes.

When the electraulically-controlled pressure relief valve system is used, the method for controlling pressures during a wellbore operation first comprises providing the electraulically controlled pressure relief valve 200 itself. The valve is provided proximate a wellbore or is otherwise at a well site. The wellbore has been formed for the purpose of producing hydrocarbon fluids to the surface in commercially viable quantities. Alternatively, the wellbore is provided for the purpose of injecting or for the disposal of fluids into a subsurface formation. Alternatively, the pressure relief valve system may be utilized in connection with a non-oil and gas operation, such as hydraulic blasting.

The method also includes placing the pressure relief valve system in fluid communication with a high-pressure injection line. Ideally, the high-pressure line extends from high pressure frac pumps to a frac tree over the wellbore. Preferably, a frac missile is placed along the high-pressure line downstream from the frac pumps, with the pressure relief valve system residing between the frac missile and a frac manifold.

Specific steps for placing the PRV system in fluid communication with the high-pressure fluid line may include:

Tying in the high-pressure fluid line to the by-pass line at an inlet;

Inspecting the sealing surface of each connection to ensure a rubber gasket is in place and that it is in good condition;

Inspecting the face of each connection to ensure that it is in good condition and is free of debris and deep scratches;

Using wing and thread style connections, attach the flow iron to the PRV skid; and Tightening hammer unions on the flow iron connections.

The pressure relief valve system is configured to be maintained in the closed state during fluid injection operations. The closed state is maintained by keeping the one or more electronically-controlled, hydraulically-actuated valves closed.

The method next includes setting one or more pressure threshold values for the pressure relief valve system. This is preferably done by providing inputs for a programmable controller. The controller is configured to receive data from the one or more pressure transducers as described above, and then compare the pressures as sensed by the transducer(s) to the stored pressure threshold.

The method further includes receiving signals from the one or more pressure transducers placed along the high-pressure line. It is understood that for purposes of the present disclosure, the term "along the high-pressure line" includes a transducer that resides adjacent a fluid inlet to the PRV where the PRV is teed off of the high-pressure line. Signals may be sent through a wireless protocol such as Zigbee or Bluetooth. Alternatively, signals may be sent through a wireless communications network. Alternatively still, signals may be sent through insulated wires or data cables. Additional transducers may reside at a frac missile, a frac manifold, or a frac tree.

The method then includes permitting fracturing fluids to flow through the high pressure frac line while pressure signals are monitored and recorded in real time. If a pressure that exceeds the pressure threshold of the pressure relief valve is detected, the plug valve(s) in the pressure relieve valve is moved by an actuator to its open position. Fracturing fluids are then permitted to escape through a relief line.

In one aspect, two or more electraulically-actuated valves, such as plug valves, are placed along the pressure relief valve system, in series. When an actuation signal is sent from the controller to open a plug valve, the controller will actually send the actuation signal to two separate actuators associated with respective plug valves. These signals are preferably sent to a separate controller that controls the actuators, wherein the actuator controller operates with an inverter.

In one aspect, the method further includes continuing to pump injection fluids through the high-pressure injection line while diverting injection fluids through the opened valves. Preferably, this is done without reducing gauge pressure at the frac missile and/or in the injection line.

When the electrically-controlled pressure relief bleed-off system is used, the method for controlling pressures during a wellbore operation further comprises placing a pressure bleed-off valve in fluid communication with the high pressure injection line. The pressure bleed-off valve comprises:
 a fluid bypass line having a fluid inlet teed into the high pressure injection line, and an opposing fluid outlet;
 a high pressure transducer located proximate the fluid inlet;
 a first plug valve residing along the fluid bypass line;
 a first electric actuator residing on the first plug valve and configured to rotate the first plug valve between open and closed positions;
 a second plug valve also residing along the fluid bypass line;
 a second electric actuator residing on the second plug valve and configured to rotate the second plug valve between close and open positions; and
 a controller.

Note that the fluid bypass line is actually a second fluid bypass line since the PRV also has a fluid bypass line.

The controller is configured to send command signals to the first actuator to rotate the first plug valve between a closed state and an open state. The controller is further configured to send control signals to the second actuator to rotate the second plug valve between a closed state and an open state.

The first plug valve and corresponding first electric actuator reside proximate the high pressure transducer. At the same time, the second plug valve and corresponding second electric actuator reside proximate the fluid outlet of the second fluid bypass line.

The method additionally includes sending a control instruction from a remote computer to the controller. In one aspect, sending a control instruction comprises (i) uploading or updating operational software for the controller, (ii) checking the status of one or more batteries associated with the pressure bleed-off valve, or (iii) checking pressure readings from the high pressure transducer.

In another aspect, sending a control instruction comprises sending a Bleed-Off signal, causing the controller to send the command signals to open the first and second plug valves. The command signals cause the second plug valve to open before the first plug valve is opened. In still another aspect, sending a control instruction comprises sending a Safe Bleed signal, causing the controller to send the command signals, thereby opening the first plug valve, the second plug valve, or both, a designated amount that is less than fully open. Preferably, the first plug valve is partially opened while the second plug valve is fully opened.

In addition to these methods for controlling pressures during a wellbore operation, a method of servicing a pressure control valve is also provided. The method first comprises providing a skid. The skid defines a steel frame having a platform. A plurality of beams extend upward from the platform and support horizontally-placed beams. These horizontally-placed beams include an I-beam. The horizontal I-beam runs across the skid at a location above components for either a pressure relief valve 200 or a pressure bleed-off valve 1100A or 1100B.

Figure 13A:
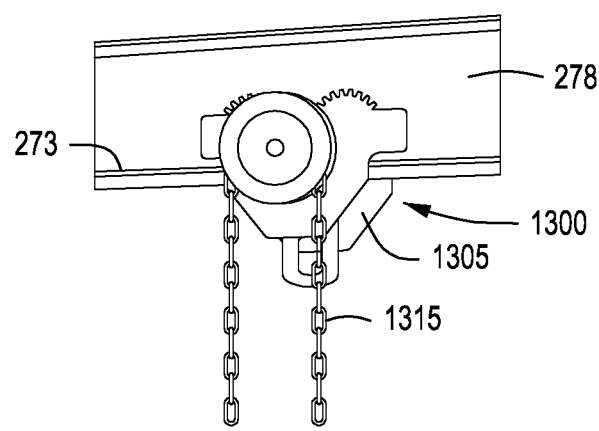
FIG. 13A is an enlarged view of a portion of a horizontal I-beam for the skid, along with a trolley and chain hoist.

FIG. 13A is a perspective view of a portion of the horizontal I-beam 278 for the skid 270. A chain hoist 1300 is shown placed along the I-beam 278. The hoist 1300 is moved along a lower rail 273 of the I-beam 278 by means of a trolley 1305.

A chain 1315 extends down from and is part of the chain hoist 1300. The chain 1315 is manipulated by hand in order to raise and lower equipment. In the present application, the chain hoist 1300 and chain 1315 are used to raise and lower an actuator (for example, actuator 240 or 1172) off of a valve (for example, plug valves 230 or 1142).

For times when a plug valve 230 needs to be serviced, there is a lock-out/tag-out 227 that disconnects all of the power from the components. In the event that a total loss of power occurs and the plug valves 230 are not able to open and relieve pressure, the 3" mechanical pop-off valve 260 will open and relieve pressure at a manufacturer-set set point.

During operation, the trolley 1305 rolls along the I-beam 278. This is done by wheels or bearings. The chain hoist 1300 of FIG. 13A is secured to the trolley 1305. The chain hoist 1300 preferably includes a sky hook or a sling 1320 at an end. In this way, the sky hook or sling 1320 may be easily positioned above or moved away from a selected actuator 240.

Figure 13B:
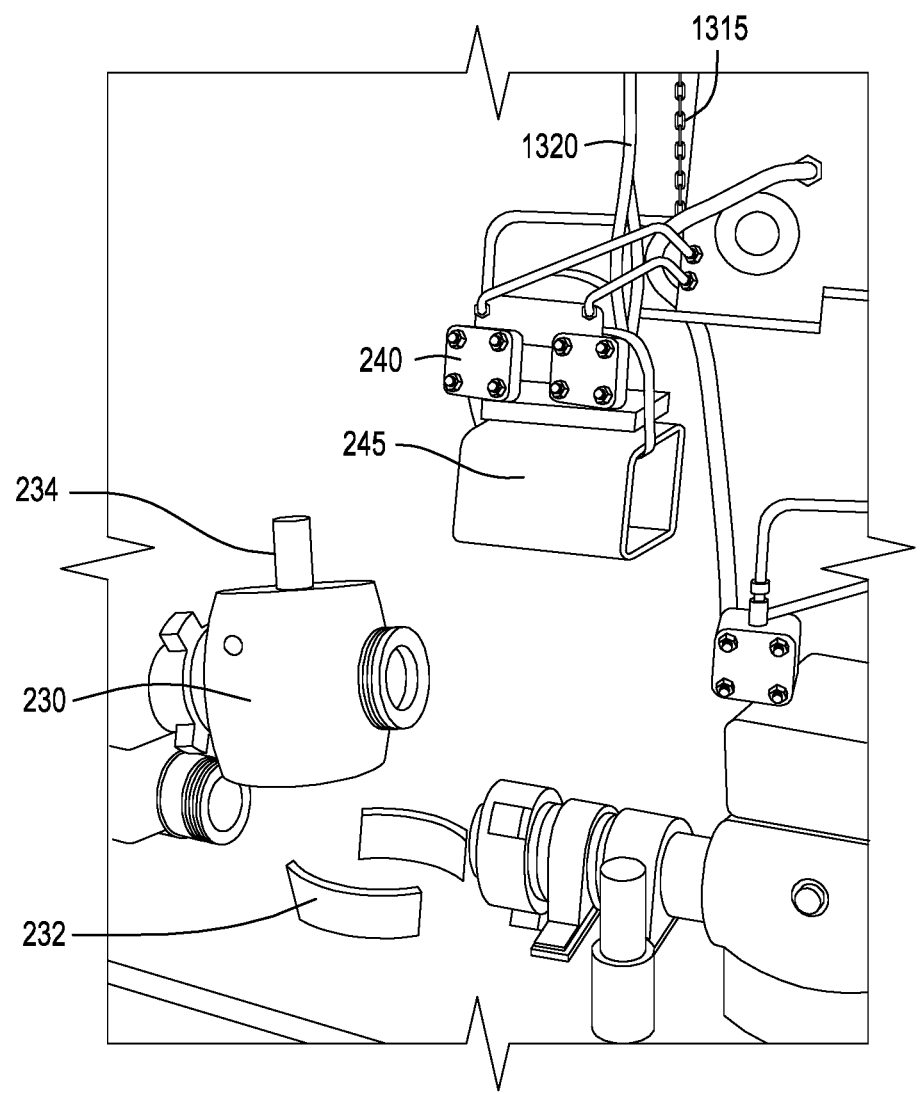
FIG. 13B shows an actuator having been lifted off of a plug valve by the use of a chain hoist and sling.

FIG. 13B shows an actuator 240 having been lifted off of a plug valve 230. A portion of the chain 1315 is visible. Also visible is a portion of a sling 1320.

In lieu of cycling the valves, the operator will change out the rotatably actuated valves. This requires that an actuator mounting bracket be disconnected from its respective valve. This is preferably done by using a hex driver and, optionally, a breaker bar to remove bolts from the mounting brackets.

Before steps are taken to remove the valves, it is preferred that the computer system be shut down by pressing the Power Button. After shut-down is complete, the operator will open the battery box and turn the 200-Amp buss fuse from the On position back to its Off position. No voltage is now being provided to the computer system and the battery box may be closed.

A hammer is used to knock loose WECO electrical connections tying into the valves. Then, using the hex drive and breaker bar, the four bolts connecting the top of the plug valves to the actuator mountings brackets are removed.

After all bolts are removed from the mounting brackets, the chain hoist (sometimes referred to in the industry as a "come-along") 1300 is moved into place over an actuator 240. The chain hoist 1300 is attached to the trolley 1305 so that it may be slidably moved (or rolled) into place over the valves 230, one at a time. Either a lifting sling 1320 (seen in FIG. 13B) or a so-called sky-hook is connected to the chain 1315.

The method then includes placing the lifting sling 1320 under an actuator 240, and then operating the chain hoist 1300 to manually lift the actuator 240 off of the valve 230. Preferably, a stem adapter (not shown) associated with the actuator 240 remains on top of a stem 234 of the plug valve 230. This ensures that damage is not done to the stem adapter during lifting and moving. The actuator 240 is then hoisted up and trolleyed to the side. This step is demonstrated by FIG. 13B, discussed above. The actuator 240 is preferably hoisted all the way to the last link on the come along to ensure no damage is done to any electrical cords or hydraulic hoses.

The method next includes changing out the valve. This means that a new, previously pressure-tested valve is installed in place of the old valve. Two hammer union connections are connected on each side of the plug valve to be removed. These must be knocked loose, freeing the plug valve.

Figure 14:
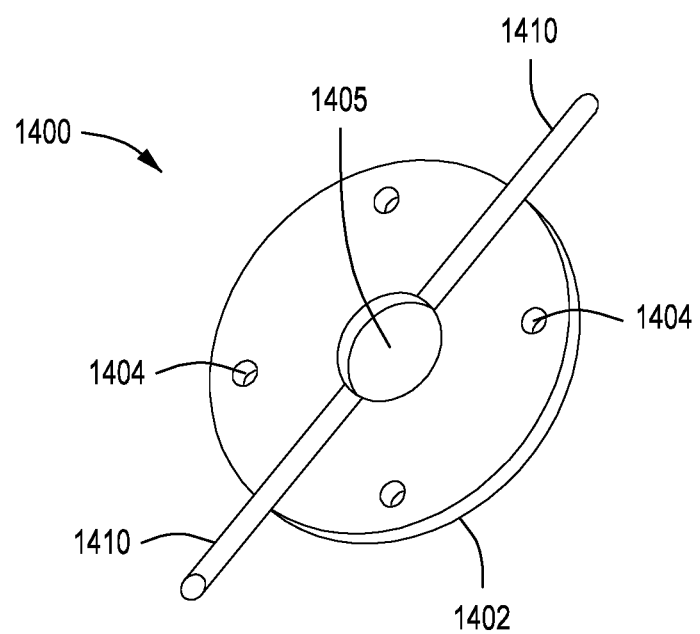
FIG. 14 is a perspective view of a plug-lifting device, in one embodiment. A pair of lifting handles is seen extending away from a center opening.

A custom plug-lifting device 1400 is threadedly coupled to the old plug. FIG. 14 is a perspective view of a plug-lifting device 1400, in one embodiment. The plug-lifting device 1400 comprises a plate 1402 having a center-opening 1405 for receiving a top of the plug valve 230, and an elongated handle 1410 extending away from the center-opening 1405 in two opposing directions. In this illustrative arrangement, the handle 1410 comprises a pair of bars welded substantially along their lengths to the plate 1402.

The plate 1402 has bolt holes 1404 configured to align with the bolt holes on the plug valve 230. The plate 1402 is then placed onto the plug valve 230, and the bolts (not shown) are placed through respective bolt holes 1404 and threadedly tightened into the corresponding bolt holes of the valve 230.

Using the two bars of the handle 1310, the plug-lifting device 1400 and connected plug valve 230 are lifted out of the valve seat 232 associated with the PRV skid. This is preferably done manually by service hands. (Note that during this exercise, the actuator 240 remains hoisted above the plug valve 230 and out of the way.) The valve 230 is then moved away from the skid 270. Preferably, the old valve is taken to the operator's service van where it may be returned to the shop and serviced for future use. This process is optionally repeated for the second plug valve.

The method also includes installing new plug valves. This is done by reversing the steps associated with removing the old plug valves. In this respect, the plug-lifting device 1300 is disconnected from the old valve, and then connected to a new valve. The new valve is then manually moved into position on the skid, and lowered into position within the plug valve housing. The actuator is then rolled (or "trolleyed") back into position over the new valve and the chain hoist is operated in order to lower the actuator down onto the valve.

Holes in the mounting bracket of the actuator are aligned with bolt holes in the valve. The hammer union connections are tightened on each side of the plug valve using, for example, an 8-pound sledgehammer. The operator will further tighten a clamp on the PRV skid that secures valves from moving during transportation and normal frac operations using two crescent wrenches or two box ¾" box wrenches.

After the clamp has been fastened down, the operator will place two key stops onto the stem 234, and place the stem adapter over the key stops. The operator will ensure that the stem position and the actuator key stop are in their proper position. The hoisted actuator will then be moved down the I-Beam 278 into position over the plug valve 230. The four bolts are then reinserted into the bolt holes on the plug valve housing in order to secure the actuator onto the new plug valve.

The chain come-along is disconnected from the trolley 1305 and from the lift slings. After all frac iron is in place and the actuator mounting bolts are tightened, the battery box is opened and the 200-Amp buss breaker is placed in its On position. This will re-supply power to the computer systems.

When the maintenance process is completed, and after a fracing operation is completed, the PRV skid 270 will be rigged down. This may include such steps as:

Closing out the operational software for the system controller and for the actuator software;
Unplugging and rolling up the ethernet cable;
Shutting down the power in the control panel;
Shutting off the switch to the 200 Amp buss breaker;
Ensuring that the battery charger is off, e.g., making sure that no lights are blinking;
Locking out the computer and batteries;
Unplugging the extension cord from the 115 VAC power unit and PRV skid, and rolling up the cord for storage;
Breaking the high-pressure fluid line and the by-pass line connections using a no-spark hammer to loosen the hammer union connections and disconnecting the lines;
Inspecting sealing surfaces; and
Rigging up lifting slings to the pick-up points on the skid for loading onto a transport trailer, or use a forklift and forklift slots on the bottom of the skid for loading.

In connection with installing a pressure control system, the operator may provide power to the PRV system and to the pressure bleed-off system for testing procedures. In one aspect, providing power means that batteries associated with the systems are turned on. Specific steps for providing this power may include:

Running an extension cord from a 115 VAC power unit to supply power to the skids;
Opening the battery box and ensuring that the battery charger is on and working properly, including no error messages, and that the battery lights are blinking to show that the batteries are charging properly;
Moving a 200 Amp buss breaker inside the battery box from an Off position to an On position so that power is now sent to the computer systems (system controller and actuator controller), and to allow the accumulators to begin to charge;
Opening the control panel system and turning the PRV system on and the bleed-off system on using a Power Button; and
Waiting for operational software to be loaded.

It is observed that connecting the extension cord will cause the batteries to begin charging. This enables power to be sent to the system controller and to the actuators.

As noted above, the pressure control valve is configured to be maintained in the closed state during fluid injection operations. The closed state is maintained by keeping the one or more plug valves closed. As part of the rig-up process, and in the case of the PRV system 200, it is desirable to check the operation of the electraulically actuated valves. This is done by sending a test signal to the actuators to cause the valves to be rotatably opened. To do this, an ethernet cable is run from the system controller to a test computer, which may be a laptop or other computer. In one aspect, the test computer residing or otherwise placed in the operator's vehicle. Operational software associated with the system controller is loaded, and communication is established between the operator's computer and the system controller.

The method next includes sending a test signal from the test computer to the pressure relief valve system. This causes the actuators to rotatably cycle the electraulically actuated valves. Preferably, the valves are plug valves that are rotatably moved from their closed states to their respective open states in less than 1.5 seconds, or even 0.3 seconds, and with less than one complete revolution. In a preferred embodiment, lubrication is provided to the plug valve before the valves are cycled in a closed-open-closed manner. The test signal may be sent two, three or more times to facilitate complete lubrication of the plug valves.

Steps for sending the test signal may include:
Connecting ethernet cable from a control enclosure to the operator's data van;
Running the ethernet cable to a control laptop computer inside of the data van and beginning the start-up process; and
Cycling the plug valves to ensure communication between the operator's laptop computer and the PRV skid and/or to provide lubrication.

As can be seen, a novel pressure control system is provided, wherein a single controller actuates plug valves associated with both a PRV system and a pressure bleed-off system. In addition, a remotely controlled, electrically actuated pressure bleed-off system is provided. Still further, a method of controlling pressure at a well site in connection with a high-pressure fluid injection operation is provided. Further still, a method of servicing a pressure bleed-off system for a hydraulic fracturing system at a well site is presented.

Further, variations of the systems and method herein may fall within the spirit of the claims, below. It will be appreciated that the inventions herein are susceptible to modification, variation and change without departing from the spirit thereof.

We claim:

1. A pressure bleed-off system, comprising:
a low pressure line having an inlet in fluid communication with a fluid injection line; a low pressure line transducer located proximate the inlet of the low pressure line;
a high pressure line also having an inlet in fluid communication with the fluid injection line;
a high pressure transducer located proximate the inlet of the high pressure line;
an outlet line placing the high pressure line in fluid communication with the low pressure line;
a fluid outlet along the outlet line;
a first high pressure line plug valve residing along the high pressure line;
a first high pressure line electric actuator residing on the first high pressure line plug valve and configured to rotate the first high pressure line plug valve between close and open positions;
a first low pressure line plug valve residing along the low pressure line;
a first low pressure line electric actuator residing on the first low pressure line plug valve and configured to rotate the first low pressure plug valve between close and open positions; and
a controller configured to send command signals to the first high pressure line electric actuator and to send command signals to the first lower pressure line electric actuator to open and close their respective plug valves, wherein the controller is configured to receive control instructions from an operator remote from the pressure bleed-off system.

2. The pressure bleed-off system of claim 1, wherein the fluid injection line is a frac line for a hydraulic fracturing operation at a well site.

3. The pressure bleed-off system of claim 2, further comprising: a second high pressure line plug valve residing along the high pressure line;
a second high pressure line electric actuator residing on the second high pressure line plug valve and configured to rotate the second high pressure line plug valve between close and open positions;
a second low pressure line plug valve residing along the low pressure line;
a second low pressure line electric actuator residing on the second low pressure line plug valve and configured to rotate the second low pressure line plug valve between close and open positions.

4. The pressure bleed-off system of claim 2, wherein:
a first high pressure elbow connection provides fluid communication between the fluid outlet line and the high pressure line; and
a second high pressure elbow connection provides fluid communication between the fluid outlet line and the low pressure line.

5. The pressure bleed-off system of claim 3, wherein:
the first high pressure line plug valve and corresponding first high pressure line electric actuator reside proximate the high pressure transducer; and
the second high pressure line plug valve and corresponding second high pressure line electric actuator reside proximate the outlet of the fluid outlet line.

6. The pressure bleed-off system of claim 5, further comprising:
a first manual plug valve residing intermediate the first high pressure line plug valve and the second high pressure line plug valve along the high pressure line; and
a second manual plug valve residing intermediate the first low pressure line plug valve and the second low pressure line plug valve along the low pressure line.

7. The pressure bleed-off system of claim 6, further comprising:
a one-way check valve residing along the high pressure fluid line, wherein the one-way check valve permits fluids to flow only in a direction from the inlet of the low pressure line to the inlet of the high pressure line; and wherein the inlet of the high pressure line and the inlet of the low pressure line straddle (i) the one-way check valve such that the high pressure line, the low pressure line, and the fluid outlet form a wishbone configuration.

8. The pressure bleed-off system of claim 7, wherein:
the inlet of the high pressure line and the inlet of the low pressure line further straddle (ii) a two-way fluid isolation valve residing between the inlet of the low pressure line and the one-way check valve.

9. The pressure bleed-off system of claim 8, further comprising:
a first intermediate pressure transducer residing between the first manual plug valve and the second high pressure line plug valve along the high pressure line; and
a second intermediate pressure transducer residing between the second lower pressure line plug valve and the second manual plug valve along the low pressure line;
and wherein:
the first intermediate pressure transducer is configured to send digital signals to the controller indicative of fluid pressure between the first high pressure line plug valve and the second high pressure line plug valve along the high pressure line in real time; and
the second intermediate pressure transducer is configured to send digital signals to the controller indicative of fluid pressure between the first low pressure line plug valve and the second lower pressure line plug valve along the low pressure line in real time.

10. The pressure bleed-off system of claim 3, wherein:
the first high pressure line plug valve and corresponding first high pressure line electric actuator reside proximate the high pressure transducer;
the second high pressure line plug valve and corresponding second high pressure line electric actuator reside proximate the outlet of the high pressure line;
the first low pressure line plug valve and corresponding first low pressure line electric actuator reside proximate the low pressure line transducer; and
the second low pressure line plug valve and corresponding second low pressure line electric actuator reside proximate the outlet of the low pressure line.

11. The pressure bleed-off system of claim 10, wherein:
the controller is configured to send the command signals to open the first high pressure line plug valve and the second high pressure line plug valve in response to a Downstream Bleed-Off signal sent by the operator as a control instruction, wherein the command signals cause the second high pressure line plug valve to open before the first high pressure line plug valve is fully opened; and
the controller is configured to send the command signals to open the first low pressure line plug valve and the second lower pressure line plug valve in response to an Upstream Bleed-Off signal sent by the operator as a control instruction, wherein the command signals cause the second low pressure line plug valve to open before the first low pressure line plug valve is fully opened.

12. The pressure bleed-off system of claim 11, wherein:
the controller is further configured to send command signals to open all of the first high pressure line plug valve, the second high pressure line plug valve, first low pressure line plug valve and the second lower pressure line plug valve together, as E-Kill signals, in response to (i) the high pressure line transducer, (ii) the low pressure line transducer, or (iii) both, sending a digital signal to the controller indicative of a pressure value that exceeds a pressure threshold value.

13. The pressure bleed-off system of claim 11, wherein:
the controller is further configured to send command signals to (i) only partially open the first high pressure line plug valve, the third-first low pressure line plug valve, or both, and (ii) cycle each of the first high pressure line plug valve and first lower pressure line plug valve between a partially opened state and a closed state.

14. A pressure bleed-off system, comprising:
a fluid bypass line having a fluid inlet and an opposing fluid outlet, and wherein the fluid inlet is in fluid communication with a high pressure fluid injection line;
a high pressure transducer located proximate the fluid inlet;
a first plug valve residing along the fluid bypass line and proximate to the high pressure transducer;
a second plug valve residing along the fluid bypass line and proximate to the fluid outlet of the bypass line;
a first electric actuator residing on the first plug valve and configured to rotate the first plug valve between open and closed positions;
a second electric actuator residing on the second plug valve and configured to rotate the second plug valve between open and closed positions; and
a controller configured to send command signals to the first actuator to rotate the first plug valve between open and close positions and to send command signals to the second actuator to rotate the second plug valve between open and close positions, wherein the controller is configured to receive control instructions from an operator remote from the pressure bleed-off system.

15. The pressure bleed-off system of claim 14, wherein the high pressure fluid injection line is a frac line for a hydraulic fracturing operation at a well site.

16. The pressure bleed-off system of claim 14, further comprising:
a manual plug valve residing intermediate the first and second plug valves along the bypass line; and
a bypass line transducer located intermediate the manual plug valve and the second plug valve.

17. The pressure bleed-off system of claim 14, further comprising:
a one-way check valve residing along the high pressure frac line proximate to but downstream of the fluid inlet of the pressure bleed-off system in a direction of flow within the frac line.

18. The pressure bleed-off system of claim 17, wherein:
the controller is configured to send the command signals to open the first and second plug valves in response to a Bleed-Off signal sent by the operator as a control instruction, wherein the command signals cause the second plug valve to open before the first plug valve is fully opened.

19. The pressure bleed-off system of claim 18, wherein:
the controller is further configured to receive a Safe Bleed signal from the operator as a control instruction, causing the first plug valve, the second plug valve, or both, to be opened a designated amount that is less than fully open.

20. The pressure bleed-off system of claim 14, further comprising:
a skid, wherein the skid supports the fluid bypass line, the high pressure transducer, the first and second plug valves, and the first and second electric actuators.

21. The pressure bleed-off system of claim 18, wherein:
the controller is further configured to send command signals to (i) only partially open the first plug valve, the second plug valve, or both, and (ii) cycle each of the first and second plug valves between a partially opened state and a closed state.

22. A pressure control system for a hydraulic fracturing operation at a well site, comprising:
a high pressure frac line;
a system controller;

a pressure relief valve system, comprising:
  a first fluid bypass line having a fluid inlet and an opposing fluid outlet, wherein the fluid inlet for the fluid bypass line is in fluid communication with the high pressure frac line;
  a pressure sensor residing proximate the fluid inlet and configured to sense fluid pressure within the high pressure frac line, and to generate electrical signals representative of fluid pressure readings within the high pressure frac line in real time;
  one or more electraulically-actuated valves configured to move between an open state and a closed state in response to command signals from the system controller;
a pressure bleed-off valve, comprising:
  a second fluid bypass line having a fluid inlet and an opposing fluid outlet, and wherein the fluid inlet for the second fluid bypass line is also in fluid communication with the high pressure frac line;
  a high pressure transducer located proximate the fluid inlet for the second bypass line;
  a first plug valve residing along the fluid bypass line;
  a first electric actuator residing along the first plug valve and configured to rotate the first plug valve between open and close positions; and
wherein the system controller is configured to:
  (i) receive the electrical signals from the pressure sensor, and process those signals by comparing fluid pressure readings with a stored pressure threshold, wherein the system controller is programmable to set the stored pressure threshold and to send actuation signals to open the one or more electraulically-actuated valves in response to determining that the pressure along the high pressure frac line meets or exceeds the stored pressure threshold; and
  (ii) send command signals to the first actuator of the pressure bleed-off system to rotate the first plug valve between open and close positions, and wherein the system controller is configured to receive control instructions from an operator remote from the pressure control system.

23. The pressure control system of claim 22, further comprising:
a second plug valve also residing along the second fluid bypass line;
a second electric actuator residing on the second plug valve and configured to rotate the second plug valve between open and close positions; and
and wherein:
the first plug valve and corresponding first electric actuator reside proximate the high pressure transducer;
the second plug valve and corresponding second electric actuator reside proximate the fluid outlet of the second fluid bypass line; and
the system controller is further configured to send command signals to the second actuator to rotate the second plug valve between its open and close positions.

24. The pressure control system of claim 23, further comprising:
a manual plug valve residing intermediate the first and second plug valves along the second fluid bypass line; and
a bypass line transducer located intermediate the manual plug valve and the second plug valve of the pressure bleed-off valve.

25. The pressure control system of claim 23, further comprising:
a one-way check valve residing along the high pressure frac line proximate to but downstream of the fluid inlet of the pressure bleed-off valve in a direction of flow within the high pressure frac line.

26. The pressure control system of claim 25, wherein:
the system controller is configured to send the command signals to open the first and second plug valves in response to a Bleed-Off signal sent by the operator as a control instruction, wherein the command signals cause the second plug valve to open before the first plug valve is fully opened.

27. The pressure control system of claim 26, wherein:
the system controller is further configured to receive a Safe Bleed signal from the operator as a control instruction, causing the first plug valve, the second plug valve, or both, to be opened a designated amount that is less than fully open.

28. The pressure control system of claim 26, wherein:
the system controller is further configured to send command signals to open the at least one electraulically-operated plug valve of the pressure relief valve system and the first and second plug valves of the pressure bleed-off valve substantially simultaneously, as E-Kill signals, in response to (i) the pressure sensor, (ii) the high pressure transducer, or (iii) both, sending a digital signal to the controller indicative of a pressure value that exceeds the pressure threshold value.

29. The pressure control system of claim 28, wherein:
the system controller is further configured to send command signals to (i) only partially open the first plug valve of the pressure bleed-off valve, the second plug valve of the pressure bleed-off valve, or both, and (ii) cycle each of the first and second plug valves between a partially opened state and a closed state.

30. A method of controlling pressure at a well site, comprising:
placing a pressure bleed-off valve in fluid communication with a high pressure frac line, wherein the pressure bleed-off valve comprises:
  a fluid bypass line having a fluid inlet teed into the high pressure frac line, and an opposing fluid outlet;
  a high pressure transducer located proximate the fluid inlet; a first plug valve residing along the fluid bypass line;
  a first electric actuator residing on the first plug valve and configured to rotate the first plug valve between open and closed positions;
  a second plug valve also residing along the fluid bypass line;
  a second electric actuator residing on the second plug valve and configured to rotate the second plug valve between open and closed positions; and
  a controller configured to send command signals to the first actuator to rotate the first plug valve between open and close positions, and to the second actuator to rotate the second plug valve between open and close positions;
and wherein:
  the first plug valve and corresponding first electric actuator reside proximate the high pressure transducer; and
  the second plug valve and corresponding second electric actuator reside proximate the fluid outlet of a second fluid bypass line; and
sending a control instruction from a remote computer to the controller.

31. The method of controlling pressure at a well site of claim 30, wherein:
   sending a control instruction comprises (i) uploading or updating operational software for the controller, (ii) checking the status of one or more batteries associated with the pressure bleed-off valve, or (iii) checking pressure readings from the high pressure transducer.

32. The method of controlling pressure at a well site of claim 30, wherein:
   sending a control instruction comprises (i) sending a Bleed-Off signal, causing the controller to send the command signals to open the first and second plug valves, or (ii) sending a Safe Bleed signal, causing the controller to send the command signals, thereby opening the first plug valve, the second plug valve, or both, a designated amount that is less than fully open.

* * * * *